US009650298B2

(12) United States Patent
Nicoleau et al.

(10) Patent No.: US 9,650,298 B2
(45) Date of Patent: May 16, 2017

(54) HARDENING ACCELERATOR COMPOSITION FOR CEMENTITIOUS COMPOSITIONS

(71) Applicant: Construction Research & Technology, GmbH, Trostberg (DE)

(72) Inventors: Luc Nicoleau, Altenmarkt (DE); Hubert Leitner, Haus/Ennstal (DE)

(73) Assignee: Construction Research & Technology GmbH, Trostberg (DE)

( * ) Notice: Subject to any disclaimer, the term of this patent is extended or adjusted under 35 U.S.C. 154(b) by 27 days.

(21) Appl. No.: 14/420,417

(22) PCT Filed: Aug. 12, 2013

(86) PCT No.: PCT/EP2013/066778
§ 371 (c)(1),
(2) Date: Feb. 9, 2015

(87) PCT Pub. No.: WO2014/026940
PCT Pub. Date: Feb. 20, 2014

(65) Prior Publication Data
US 2015/0197448 A1   Jul. 16, 2015

(30) Foreign Application Priority Data
Aug. 13, 2012   (EP) .................................... 12180205

(51) Int. Cl.
*C04B 24/18* (2006.01)
*C04B 24/26* (2006.01)
*C04B 22/00* (2006.01)
*C04B 40/00* (2006.01)
*C04B 22/06* (2006.01)
*C04B 24/22* (2006.01)
C04B 103/14 (2006.01)

(52) U.S. Cl.
CPC ...... *C04B 24/2694* (2013.01); *C04B 22/0086* (2013.01); *C04B 22/064* (2013.01); *C04B 24/18* (2013.01); *C04B 24/226* (2013.01); *C04B 40/0039* (2013.01); *C04B 2103/14* (2013.01)

(58) Field of Classification Search
CPC ... C04B 24/2694; C04B 24/18; C04B 24/226; C04B 22/064; C04B 22/226
USPC .......................................................... 524/5
See application file for complete search history.

(56) References Cited

U.S. PATENT DOCUMENTS

| 3,686,133 | A | 8/1972 | Hattori et al. |
|---|---|---|---|
| 4,725,665 | A | 2/1988 | Pieh et al. |
| 5,332,041 | A | 7/1994 | Onan et al. |
| 5,355,954 | A | 10/1994 | Onan et al. |
| 5,360,841 | A | 11/1994 | Knop et al. |
| 5,413,634 | A | 5/1995 | Shawl et al. |
| 5,609,680 | A | 3/1997 | Kobayashi et al. |
| 5,709,743 | A | 1/1998 | Leture et al. |
| 5,750,634 | A | 5/1998 | Albrecht et al. |
| 5,879,445 | A | 3/1999 | Guicquero et al. |
| 5,925,184 | A | 7/1999 | Hirata et al. |
| 6,133,347 | A | 10/2000 | Vickers, Jr. et al. |
| 6,170,574 | B1 | 1/2001 | Jones |
| 6,451,881 | B1 | 9/2002 | Vickers, Jr. et al. |
| 6,492,461 | B1 | 12/2002 | Vickers, Jr. et al. |
| 6,832,652 | B1 | 12/2004 | Dillenbeck et al. |
| 6,855,752 | B2 | 2/2005 | Velten et al. |
| 6,861,459 | B2 | 3/2005 | Vickers et al. |
| 6,908,955 | B2 | 6/2005 | Porsch et al. |
| 7,041,167 | B2 | 5/2006 | Jiang |
| 7,258,736 | B2 | 8/2007 | Oriakhi et al. |
| 7,605,196 | B2 | 10/2009 | Schinabeck et al. |
| 7,641,731 | B2 | 1/2010 | Chanut et al. |
| 7,772,300 | B2 | 8/2010 | Schinabeck et al. |
| 8,343,271 | B1 | 1/2013 | Lu et al. |
| 8,349,960 | B2 | 1/2013 | Gaeberlein et al. |
| 8,436,072 | B2 | 5/2013 | Herth et al. |
| 2002/0129743 | A1 | 9/2002 | Frailey et al. |
| 2003/0181579 | A1 | 9/2003 | Porsch et al. |
| 2004/0261664 | A1 | 12/2004 | Oriakhi et al. |
| 2006/0213395 | A1 | 9/2006 | Lu et al. |

(Continued)

FOREIGN PATENT DOCUMENTS

| CA | 2071051 A1 | 12/1992 |
|---|---|---|
| DE | 35 27 981 A1 | 2/1987 |

(Continued)

OTHER PUBLICATIONS

Matsuyama, et al., "The Formation of C—S—H/polymer complexes with superplasticizing polymers", Concrete Science and Engineering, pp. 148-156, vol. 1, Sep. 1999, RILEM Publications S.A.R.L.
Markus Arnold Dissertation, "Polymer-Controlled Crystallization of Calcium Hydroxide and Calcium Silicate Hydrate", University of Siegen, pp. 1-180, 2004. ((English language translation of pertinent sections (pp. 113-157, 167-168 and 177-178) are provided)).
PCT/EP2013/066778—International Search Report, Dec. 3, 2013.
PCT/EP2013/066778—International Written Opinion, Dec. 3, 2013.
PCT/EP2013/066778—International Preliminary Report on Patentability, Feb. 17, 2015.
Cölfen, Helmut; "Analytical Ultracentrifugation of Nanoparticles"; Polymer News; 2004; vol. 29; p. 101-116; Taylor & Francis; Abstract.

(Continued)

*Primary Examiner* — Jim J Seidleck
*Assistant Examiner* — Deve E Valdez
(74) *Attorney, Agent, or Firm* — Curatolo Sidoti Co., LPA; Joseph G. Curatolo; Salvatore A. Sidoti

(57) ABSTRACT

The invention concerns a process for the for the preparation of a hardening accelerator composition by reaction of a water-soluble calcium compound with a water-soluble silicate compound, the reaction being carried out in the presence of an aqueous solution which contains a plasticizer suitable for hydraulic binders, characterized in that said reaction is being carried out in the presence of apatite and that the molar ratio of calcium to phosphor in the hardening accelerator is from 25/1 to 400/1.

21 Claims, 1 Drawing Sheet

(56) References Cited

U.S. PATENT DOCUMENTS

| | | |
|---|---|---|
| 2007/0032550 A1 | 2/2007 | Lewis et al. |
| 2007/0163470 A1 | 7/2007 | Chanut et al. |
| 2008/0108732 A1 | 5/2008 | Wieland et al. |
| 2008/0190614 A1 | 8/2008 | Ballard |
| 2008/0200590 A1 | 8/2008 | Schinabeck et al. |
| 2008/0319217 A1 | 12/2008 | Ingrisch et al. |
| 2009/0054558 A1 | 2/2009 | Wieland et al. |
| 2009/0186964 A1 | 7/2009 | Schinabeck et al. |
| 2009/0229492 A1 | 9/2009 | Mills |
| 2010/0190888 A1 | 7/2010 | Gaeberlein et al. |
| 2011/0015301 A1 | 1/2011 | Herth et al. |
| 2011/0095227 A1 | 4/2011 | Herth et al. |
| 2011/0160393 A1 | 6/2011 | Sakamoto et al. |
| 2011/0269875 A1* | 11/2011 | Nicoleau ............ C04B 28/02 524/2 |
| 2012/0196046 A1 | 8/2012 | Nicoleau et al. |
| 2012/0216724 A1 | 8/2012 | Nicoleau et al. |
| 2012/0220696 A1 | 8/2012 | Nicoleau et al. |
| 2012/0270969 A1 | 10/2012 | Bichler et al. |
| 2012/0270970 A1 | 10/2012 | Bichler et al. |
| 2013/0035423 A1 | 2/2013 | Sabio et al. |
| 2013/0118381 A1 | 5/2013 | Frenkenberger et al. |
| 2014/0066546 A1 | 3/2014 | Langlotz et al. |

FOREIGN PATENT DOCUMENTS

| | | |
|---|---|---|
| DE | 43 42 407 A1 | 6/1995 |
| DE | 44 11 797 A1 | 10/1995 |
| DE | 197 24 700 A1 | 12/1998 |
| DE | 103 51 259 A1 | 6/2005 |
| DE | 10 2005 001 101 A1 | 7/2006 |
| DE | 20 2006 016 797 U1 | 12/2006 |
| DE | 10 2006 041 552 A1 | 3/2008 |
| EP | 0 518 156 A2 | 12/1992 |
| EP | 1 138 697 B1 | 11/2003 |
| EP | 1 655 272 A1 | 5/2006 |
| FR | 2 958 931 | 4/2010 |
| JP | 2000-095554 A | 4/2000 |
| JP | 2001-058863 A | 3/2001 |
| JP | 2003-292357 A | 10/2003 |
| JP | 2008-127247 | 6/2008 |
| WO | WO 94/08913 A1 | 4/1994 |
| WO | WO 00/44487 A1 | 8/2000 |
| WO | WO 01/04185 A1 | 1/2001 |
| WO | WO 02/070425 A1 | 9/2002 |
| WO | WO 2006/138277 A2 | 12/2006 |
| WO | WO 2007/125311 A1 | 11/2007 |
| WO | WO 2008/145975 A1 | 12/2008 |
| WO | WO 2010/026155 A1 | 3/2010 |
| WO | WO 2010/040611 A1 | 4/2010 |
| WO | WO 2011/026720 A1 | 3/2011 |

OTHER PUBLICATIONS

Saito, Fumio, et al.; "Mechanochemical Synthesis of Hydrated Calcium Silicates by Room Temperature Grinding"; Solid State Ionics; 1997; pp. 37-43; Elsevier.

"Silica"; Ullmann's Encyclopedia of Industrial Chemistry; 2002; Wiley-VCH Verlag GmbH & Co. KGaA; Abstract.

Benard, et al. "Hydration process and rheological properties of cement pastes modified by orthophosphate addition"; Journal of the European Ceramic Society; Jul. 1, 2005; vol. 25; No. 11; pp. 1877-1883; Elsevier Science Publishers, Barking, Essex, Great Britain.

* cited by examiner

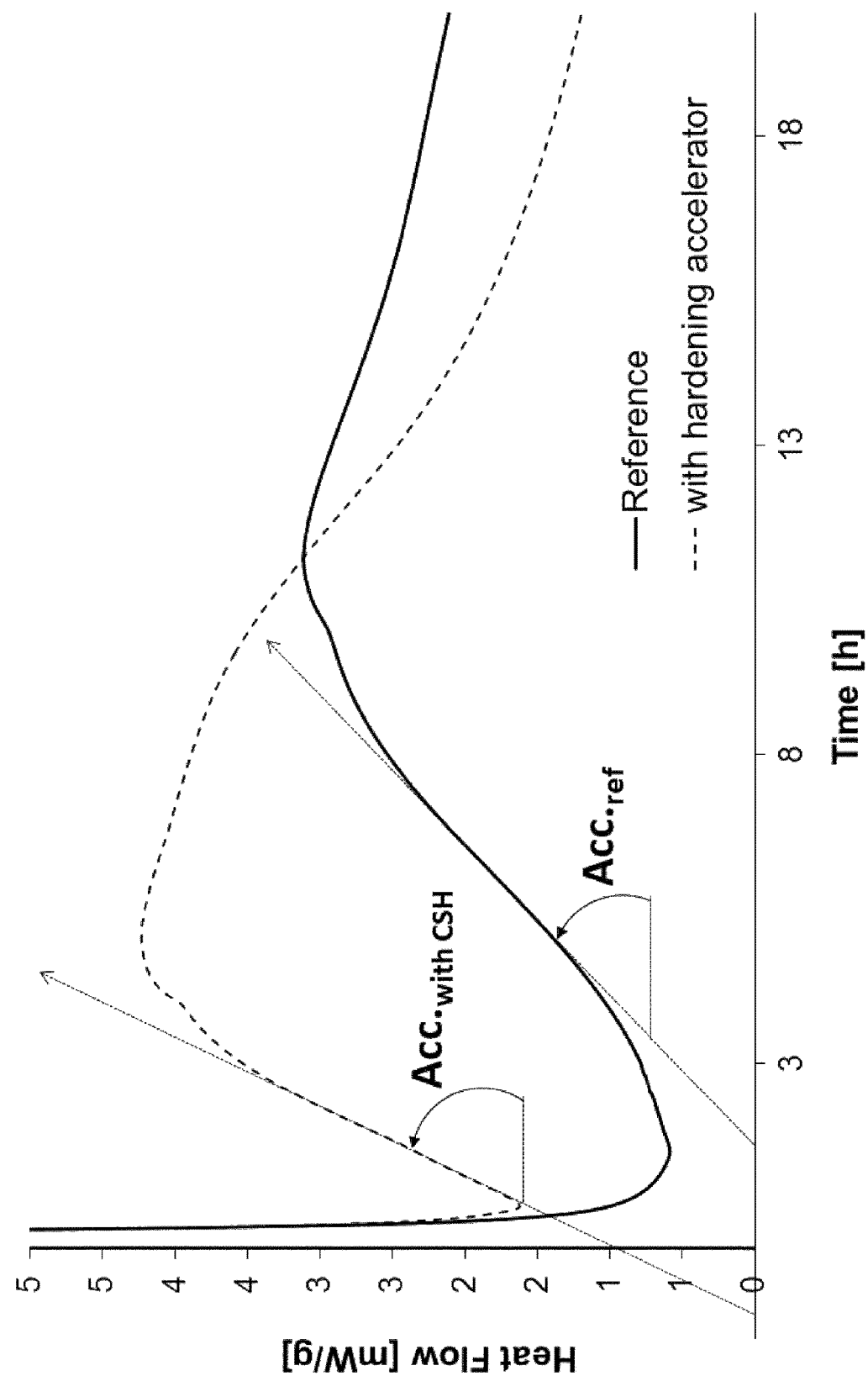

HARDENING ACCELERATOR COMPOSITION FOR CEMENTITIOUS COMPOSITIONS

CROSS REFERENCE TO RELATED APPLICATIONS

This application is a national stage application of International Application No. PCT/EP2013/066778, filed 12 Aug. 2013, which claims priority from European Patent Application No. 12180205.2, filed 13 Aug. 2012, from which applications priority is claimed, and which are incorporated herein by reference.

The present invention relates to a process for the preparation of a hardening accelerator composition, the hardening accelerator composition obtainable by the process, its use in building material mixtures and building material mixtures containing the hardening accelerator composition obtainable by the process.

It is known that admixtures in the form of dispersants are often added to aqueous slurries of pulverulent inorganic or organic substances, such as clays, silicate powders, chalks, carbon blacks, powdered rocks and hydraulic binders, for improving their workability, i.e. kneadability, spreadability, sprayability, pumpability or flowability. Such admixtures are capable of breaking up solid agglomerates, dispersing the particles formed and in this way improving the fluidity. This effect is also utilised in a targeted manner in particular in the preparation of building material mixtures which contain hydraulic binders, such as cement, lime, gypsum, calcium sulphate hemihydrate (bassanite), anhydrous calcium sulphate (anhydrite), or latent hydraulic binders, such as fly ash, blast furnace slag or pozzolans.

In order to convert these building material mixtures based on said binders into a ready-to-use, workable form, as a rule substantially more mixing water is required than would be necessary for the subsequent hydration and hardening process. The proportion of pores which are formed in the concrete body by the excess water which subsequently evaporates leads to significantly poorer mechanical strengths and durabilities.

In order to reduce this excess proportion of water at a predetermined processing consistency and/or to improve the workability at a predetermined water/binder ratio, admixtures which are generally referred to as water-reducer compositions or plasticizers are used. In particular, copolymers which are prepared by free radical copolymerization of acid monomers with polyether macromonomers are used in practice as such compositions.

Furthermore, admixtures for building material mixtures comprising hydraulic binders typically also contain hardening accelerators which shorten the setting time of the hydraulic binder. According to WO 02/070425, calcium silicate hydrate in particular present in dispersed (finely or particularly finely dispersed) form, can be used as such a hardening accelerator.

In WO 2010/026155 A1 calcium silicate hydrate suspensions are described, which are produced by reacting water-soluble calcium compounds and water-soluble silicate compounds in the presence of an aqueous solution which contains a water-soluble comb polymer suitable as a plasticizer for hydraulic binders. The accelerators of said patent application provide a progress in the art of concrete technology, as the acceleration of the hardening of cementitious compositions could be considerably improved compared to the prior art, especially without a decrease of the 28 days strength in concrete.

The water-soluble comb polymer suitable as a plasticizer for hydraulic binders in WO 2010/026155 A1 comprises various chemistries with different types of acid monomers and polyether macromonomers. The suspensions of calcium silicate hydrate disclosed in WO 2010/026155 A1 have still an improvement potential with respect to their activity as hardening accelerator, especially with respect to their dosage efficiency. This means especially that it should be possible to decrease the dosage of the hardening accelerator in order to obtain the same acceleration effect or to improve the acceleration effect at the same dosage. The economic advantage of the increase in dosage efficiency is obvious as the cost of the products decreases and the performance of the accelerators can be improved. Moreover less stock volume will be needed during production, distribution and storage of the hardening accelerators.

The object of the present invention is therefore to provide a composition which acts as an improved hardening accelerator with increased dosage efficiency.

This object is achieved by a process for the preparation of a hardening accelerator composition, preferably containing calcium silicate hydrate, by reaction of a water-soluble calcium compound, preferably calcium salt, with a water-soluble silicate compound, the reaction of the water-soluble calcium compound with the water-soluble silicate compound being carried out in the presence of an aqueous solution which contains a plasticizer suitable for hydraulic binders, selected from the group of (A) comb polymers, (B) polycondensates containing (I) at least one structural unit consisting of an aromatic or heteroaromatic moiety bearing a polyether side chain and (II) at least one structural unit consisting of an aromatic or heteroaromatic moiety bearing at least one phosphoric acid ester group, (C) lignosulphonates and/or (D) β-naphthalene sulphonate formaldehyde condensates (BNS), characterized in that the reaction of the water-soluble calcium compound with the water-soluble silicate compound is being carried out in the presence of apatite and that the molar ratio of calcium to phosphor in the hardening accelerator is from 25/1 to 400/1, preferably from 50/1 to 400/1, more preferably from 80/1 to 400/1. The phosphor in the hardening accelerator is preferably contained in the form of apatite.

The wording "plasticizer suitable for hydraulic binders, selected from the group of (A) comb polymers, (B) polycondensates containing (I) at least one structural unit consisting of an aromatic or heteroaromatic moiety bearing a polyether side chain and (II) at least one structural unit consisting of an aromatic or heteroaromatic moiety bearing at least one phosphoric acid ester group, (C) lignosulphonates and/or (D) β-naphthalene sulphonate formaldehyde condensates (BNS)" is to be abbreviated in this patent application as "plasticizer (A), (B), (C) and/or (D)".

Preferably the solubility of the calcium compound and of the silicate compound is higher than 0.1 g/l, more preferably 1 g/l in water at a temperature of 20° C. and normal pressure. In principle, only relatively slightly water-soluble compounds are also suitable in each case as water-soluble calcium compounds and water-soluble silicate compounds, although readily water-soluble compounds (which dissolve completely or virtually completely in water) are preferred in each case. However, it must be ensured there is a sufficient reactivity for the reaction in the aqueous environment with the corresponding reactant (either water-soluble calcium compound or water-soluble silicate compound). It is to be assumed that the reaction takes place between the water-soluble calcium compound and the water-soluble silicate compound in the aqueous solution. The reaction product calcium silicate hydrate is much less soluble in water compared to the reactants and the calcium silicate hydrate precipitates.

In the context of the present invention, (A) comb polymers are to be understood as polymers which have relatively long side chains (having a molecular weight of in each case at least 200 g/mol, particularly preferable at least 400 g/mol) on a linear main chain at more or less regular intervals. The lengths of these side chains are frequently approximately equal but may also differ greatly from each other (for example when polyether macromonomers having side chains of different length are incorporated in the form of polymerized units). Such polymers can be obtained for example by a radical polymerization of acid monomers and polyether macromonomers. Esterification and/or amidation of poly (meth)acrylic acid and similar (co)polymers like for example acrylic/maleic acid copolymers with suitable monohydroxy functional, respectively monoamino functional poly alkylene glycols, preferably alkyl polyethylene glycols is an alternative route to such comb polymers. Comb polymers obtainable by esterification and/or amidation of poly (meth)acrylic acid are for example described in EP1138697B1, the disclosure of which is incorporated by reference.

Preferably the average molecular weight $M_w$ as determined by gel permeation chromatography (GPC) of the water-soluble comb-polymer (A) suitable as a plasticizer for hydraulic binders is from 5.000 to 200.000 g/mol, more preferably from 10.000 to 80.000 g/mol, most preferably from 20.000 to 70.000 g/mol. The polymers were analyzed by means of size exclusion chromatography with respect to average molar mass and conversion (column combination: OH-Pak SB-G, OH-Pak SB 804 HQ and OH-Pak SB 802.5 HQ from Shodex, Japan; Eluent: 80% by volume of aqueous solution of $HCO_2NH_4$ (0.05 mol/l) and 20% by volume of acetonitrile; injection volume 100 μl; flowrate 0.5 ml/min). The calibration for determining the average molar mass was effected using linear poly(ethylene oxide) and polyethylene glycol standards. As a measure of the conversion, the peak of the copolymer is standardized to a relative height of 1 and the height of the peak of the unconverted macromonomer/PEG-containing oligomer is used as a measure of the content of residual monomer.

Preferably the (A) water-soluble comb polymer suitable as a plasticizer for hydraulic binders fulfils the requirements of the industrial standard EN 934-2 (February 2002).

The plasticizer according to this invention can also be (B) polycondensates containing (I) at least one structural unit consisting of an aromatic or heteroaromatic moiety bearing a polyether side chain, preferably a poly alkylene glycol side chain, more preferably a poly ethylene glycol side chain and (II) at least one structural unit consisting of an aromatic or heteroaromatic moiety bearing at least one phosphoric acid ester group and/or its salt.

The polycondensates according to this embodiment are known in the prior art (US 20080108732 A1) to be effective as a superplasticiser in cementitious compositions. US 20080108732 A1 describes polycondensates based on an aromatic or heteroaromatic compound (A) having 5 to 10 C atoms or heteroatoms in the aromatic ring system, having at least one oxyethylene or oxypropylene radical, and an aldehyde (C) selected from the group consisting of formaldehyde, glyoxylic acid and benzaldehyde or mixtures thereof, which result in an improved plasticizing effect of inorganic binder suspensions compared with the conventionally used polycondensates and maintain this effect over a longer period ("slump retention"). In a particular embodiment, these may also be phosphated polycondensates.

Typically the polycondensate (B) contains (I) at least one structural unit consisting of an aromatic or heteroaromatic moiety bearing a polyether side chain, preferably a polyalkylene glycol side chain, more preferably a polyethylene glycol side chain. The structural unit consisting of an aromatic or heteroaromatic moiety bearing a polyether side chain, preferably a polyethylene glycol side chain is selected preferably from the group of alkoxylated, preferably ethoxylated, hydroxy-functionalized aromates or heteroaromates (for example the aromates can be selected from phenoxyethanol, phenoxypropanol, 2-alkoxyphenoxyethanols, 4-alkoxyphenoxyethanols, 2-alkylphenoxyethanols, 4-alkylphenoxyethanols) and/or alkoxylated, preferably ethoxylated, amino-functionalized aromates or heteroaromates (for example the aromates can be selected from N,N-(Dihydroxyethyl)aniline, N,-(Hydroxyethyl)aniline, N,N-(Dihydroxypropyl)aniline, N,-(Hydroxypropyl)aniline). More preferable are alkoxylated phenol derivatives (for example phenoxyethanol or phenoxypropanol), most preferable are alkoxylated, especially ethoxylated phenol derivatives featuring weight average molecular weights between 300 g/mol and 10,000 g/mol (for example polyethylenglycol monophenylethers).

Typically the polycondensate contains (II) at least one phosphated structural unit consisting of an aromatic or heteroaromatic moiety bearing at least one phosphoric acid ester group and/or a salt of the phosphoric acid ester group, which is selected preferably from the group of alkoxylated hydroxy-functionalized aromates or heteroaromates (for example phenoxyethanol phosphate, polyethylenglycol monophenylether phosphates) and/or alkoxylated amino-functionalized aromates or heteroaromates (for example N,N-(Dihydroxyethyl)aniline diphosphate, N,N-(Dihydroxyethyl)aniline phosphate, N,-(Hydroxypropyl)aniline phosphate), which bear at least one phosphoric acid ester group and/or a salt of the phosphoric acid ester group (e.g. by esterification with phosphoric acid and optional addition of bases). More preferable are alkoxylated phenols bearing at least one phosphoric acid ester group and/or a salt of the phosphoric acid ester group (for example polyethylenglycol monophenylether phosphates with less than 25 ethylene glycol units) and most preferable are the respective alkoxylated phenols featuring weight average molecular weights between 200 g/mol and 600 g/mol (for example phenoxyethanol phosphate, polyethylenglycol monophenylether phosphates with 2 to 10 ethyleneglycol units), the alkoxylated phenols bearing at least one phosphoric acid ester group and/or a salt of the phosphoric acid ester group (e.g. by esterification with phosphoric acid and optional addition of bases).

Preferable is a process characterized in that in the polycondensate (B) the structural units (I) and (II) are represented by the following general formulae

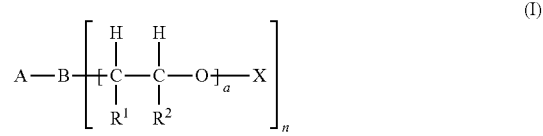

(I)

where
A are identical or different and are represented by a substituted or unsubstituted aromatic or heteroaromatic compound having 5 to 10 C atoms, preferably the 5 to 10 C atoms are contained in the aromatic or heteroaromatic ring, where B are identical or different and are represented by N, NH or O where n is 2 if B is N and n is 1 if B is NH or O where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H where a are identical or different and are represented by an integer from 1 to 300 where

X are identical or different and are represented by a branched or straight-chain $C_1$- to $C_{10}$-alkyl radical, $C_5$- to $C_8$-cycloalkyl radical, aryl radical, heteroaryl radical or H, preferably H,

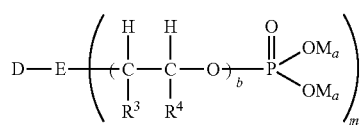

(II)

where

D are identical or different and are represented by a substituted or unsubstituted heteroaromatic compound having 5 to 10 C atoms, preferably the 5 to 10 C atoms are contained in the aromatic or heteroaromatic ring, where E are identical or different and are represented by N, NH or O where m is 2 if E is N and m is 1 if E is NH or O where $R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H where b are identical or different and are represented by an integer from 1 to 300 where

M is independently of one another an alkaline metal ion, alkaline earth metal ion, ammonium ion, organic ammonium ion and/or H, a is 1 or in the case of alkaline earth metal ions ½.

The groups A and D in the general formulae (I) and (II) of the polycondensate are preferably represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, it being possible for A and D to be chosen independently of one another and also in each case to consist of a mixture of said compounds. The groups B and E, independently of one another, are preferably represented by O. The radicals $R^1$, $R^2$, $R^3$ and $R^4$ can be chosen independently of one another and are preferably represented by H, methyl, ethyl or phenyl, particularly preferably by H or methyl and especially preferably by H.

In general formula (I) a is preferably represented by an integer from 1 to 300, in particular 3 to 200 and particularly preferably 5 to 150 and b in general formula (II) by an integer from 1 to 300, preferably 1 to 50 and particularly preferably 1 to 10. The respective radicals, the length of which is defined by a and b, respectively, may consist here of uniform building blocks, but a mixture of different building blocks may also be expedient. Furthermore, the radicals of the general formulae (I) or (II), independently of one another, may each have the same chain length, a and b each being represented by a number. As a rule, however, it will be expedient if mixtures having different chain lengths are present in each case so that the radicals of the structural units in the polycondensate have different numerical values for a and independently for b.

Frequently, the phosphated polycondensate (B) has a weight average molecular weight of 5.000 g/mol to 200.000 g/mol, preferably 10.000 to 100.000 g/mol and particularly preferably 15.000 to 55.000 g/mol.

The phosphated polycondensate can be present also in form of its salts, as for example the sodium, potassium, organic ammonium, ammonium and/or calcium salt, preferably as the sodium and/or calcium salt.

Typically the molar ratio of the structural units (I):(II) is 1:10 to 10:1, preferably 1:8 to 1:1. It is advantageous to have a relatively high proportion of structural units (II) in the polycondensate because a relatively high negative charge of the polymers has a good influence on the stability of the suspensions.

Preferably the polycondensate contains a further structural unit (III) which is represented by the following formula

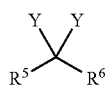

(III)

where

Y, independently of one another, are identical or different and are represented by (I), (II), or further constituents of the polycondensate where $R^5$ are identical or different and are represented by H, $CH_3$, COOH or a substituted or unsubstituted aromatic or heteroaromatic compound having 5 to 10 C atoms, preferably H where $R^6$ are identical or different and are represented by H, $CH_3$, COOH or a substituted or unsubstituted aromatic or heteroaromatic compound having 5 to 10 C atoms, preferably H.

The polycondensates are typically prepared by a process in which (I) at least one structural unit consisting of an aromatic or heteroaromatic moiety bearing a polyether side chain (for example poly(ethyleneglycol)monophenyl ether) and (II) at least one structural unit consisting of an aromatic or heteroaromatic moiety bearing at least one phosphoric acid ester group and/or a salt of the phosphoric acid ester group (for example phenoxyethanol phosphoric acid ester) are reacted with (IIIa) a monomer having a keto group. Preferably the monomer having a keto group is represented by the general formula (IIIa),

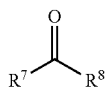
(IIIa)

where
R⁷ are identical or different and are represented by H, CH$_3$, COOH and/or a substituted or unsubstituted aromatic or heteroaromatic compound having 5 to 10 C atoms, preferably H,
where
R⁸ are identical or different and are represented by H, CH$_3$, COOH and/or a substituted or unsubstituted aromatic or heteroaromatic compound having 5 to 10 C atoms, preferably H. Preferably the monomer having a keto group is selected from the group of ketones, preferably being an aldehyde, most preferably formaldehyde. Examples for chemicals according to general structure (IIIa) are formaldehyde, acetaldehyde, acetone, glyoxylic acid and/or benzaldehyde. Formaldehyde is preferable.

Preferably R⁵ and R⁶ in structural unit (III), independently of one another, are identical or different and are represented by H, COOH and/or methyl. Most preferably H.

Preferably the molar ratio of the structural units [(I)+(II)]:(III) is 1:0.8 to 3 in the polycondensate.

Preferably the polycondensation is carried out in the presence of an acidic catalyst, this catalyst preferably being sulphuric acid, methanesulphonic acid, para-toluenesulphonic acid or mixtures thereof. The polycondensation and the phosphation are advantageously carried out at a temperature between 20 and 150° C. and a pressure between 1 and 10 bar. In particular, a temperature range between 80 and 130° C. has proved to be expedient. The duration of the reaction may be between 0.1 and 24 hours, depending on temperature, the chemical nature of the monomers used and the desired degree of crosslinking.

Crosslinking can preferably occur if monosubstituted monomers of structural unit I and/or II are used because the condensation reaction can occur in the two ortho positions and the para position. Once the desired degree of polycondensation has been reached, which can also be determined, for example, by measurement of the viscosity of the reaction mixture, the reaction mixture is cooled.

The reaction mixture might be subjected to a thermal after treatment at a pH between 8 and 13 and a temperature between 60 and 130° C. after the end of the condensation and phosphation reaction. As a result of the thermal after treatment, which advantageously lasts for between 5 minutes and 5 hours, it is possible substantially to reduce the aldehyde content, in particular the formaldehyde content, in the reaction solution. Alternatively the reaction mixture can be subjected to a vacuum treatment or other methods known in the prior art to reduce the content of (form)aldehyde.

In order to obtain a better shelf life and better product properties, it is advantageous to treat the reaction solutions with basic compounds. It is therefore to be regarded as being preferred to react the reaction mixture after the end of the reaction with a basic sodium, potassium, ammonium or calcium compound. Sodium hydroxide, potassium hydroxide, ammonium hydroxide or calcium hydroxide has proved to be particularly expedient here, it being regarded as being preferred to neutralize the reaction mixture. However, other alkali metal and alkaline earth metal salts and salts of organic amine are suitable as salts of the phosphated polycondensates as well.

Mixed salts of the phosphated polycondensates can also be prepared by reaction of the polycondensates with at least two basic compounds.

The catalyst used can also be separated off. This can conveniently be done via the salt formed during the neutralization. If sulphuric acid is used as a catalyst and the reaction solution is treated with calcium hydroxide, the calcium sulphate formed can be separated off, for example, in a simple manner by filtration.

Furthermore, by adjusting the pH of the reaction solution to 1.0 to 4.0, in particular 1.5 to 2.0, the phosphated polycondensate can be separated from the aqueous salt solution by phase separation and can be isolated. The phosphated polycondensate can then be taken up in the desired amount of water. However, other methods known to the person skilled in the art, such as dialysis, ultrafiltration or the use of an ion exchanger, are also suitable for separating off the catalyst.

(C) Lignosulphonates are a by-product from the production of cellulose for the production of paper. Lignosulphonates are well-known as plasticizers (water-reducers) for cementitious products like concrete and mortar. Typically these products are a by-product from the production of cellulose and are made from wood pulp waste. In this process the lignin is made water-soluble by a sulphonation process and in this way separated from the much less good water-soluble cellulose. The lignosulphonates are typically present in their salt form as sodium and/or calcium salts or also as magnesium salts. Products are offered in the market especially from the Norwegian company (Borregaard LignoTech), for example under the product name Borresperse.

(D) β-naphthalene sulphonate formaldehyde condensates (BNS), also known as naphthalene-formaldehyde sulphonates ("NFS") disperse cement particles by an electrostatic repulsion that results from adsorption processes. Usually, such condensates suitable as plasticizer or dispersants are prepared by the reaction of aromatic sulphonic acids, preferably naphthalene sulphonic acid with formaldehyde at ambient pressure and at temperatures up to 100° C. The ratio between formaldehyde and the sulphonated naphthalene component is usually from 0.7 up to 3.5, preferably from 0.8 to 1. The preparation and use of BNS as a plasticizer for cementitious compositions is well known state of the art and disclosed for example in U.S. Pat. No. 4,725,665 and U.S. Pat. No. 3,686,133.

Preferably also the plasticizers (B), (C) and (D) fulfil the requirements of the industrial standard EN 934-2 (February 2002). It is possible to use a mixture of plasticizers (A), (B), (C) and (D) or each plasticizer alone or any combination.

In principle, the accelerator contains an inorganic and an organic component. The inorganic component may be regarded as modified, finely dispersed calcium silicate hydrate, which may contain foreign ions, such as magnesium and aluminium. The calcium silicate hydrate is prepared in the presence of plasticizer (A), (B), (C) and/or (D) (organic component). Preferable is the plasticizer (A) with a comb polymer structure, preferably obtained by a radical polymerization process. The process according to this invention is characterized in that the reaction of the water-soluble calcium compound with the water-soluble silicate compound is besides the presence of plasticizer (A), (B), (C) and/or (D) being carried out in the presence of apatite and that the molar ratio of calcium to phosphor in the hardening accelerator is from 25/1 to 400/1, preferably from 50/1 to 400/1, more preferably from 80/1 to 400/1. Usually, a suspension containing the calcium silicate hydrate in finely dispersed form is obtained, which suspension effectively accelerates the hardening process of hydraulic binders.

The inorganic component can in most cases be described with regard to its composition by the following empirical formula:

a CaO, SiO$_2$, b Al$_2$O$_3$, c H$_2$O, d Z$_2$O, e WO

Z is an alkali metal

W is an alkaline earth metal, preferably W is an alkaline earth metal, which is different from calcium,

| | | |
|---|---|---|
| 0.1 ≤ a ≤ 2 | preferably | 0.66 ≤ a ≤ 1.8 |
| 0 ≤ b ≤ 1 | preferably | 0 ≤ b ≤ 0.1 |
| 1 ≤ c ≤ 6 | preferably | 1 ≤ c ≤ 6.0 |
| 0 ≤ d ≤ 1 | preferably | 0 ≤ d ≤ 0.4 |
| 0 ≤ e ≤ 2 | preferably | 0 ≤ e ≤ 0.1 |

In a preferred embodiment, the aqueous solution also contains, in addition to silicate and calcium ions, further dissolved ions which are preferably provided in the form of dissolved aluminium salts and/or dissolved magnesium salts. As aluminium salts preferably aluminium halogens, aluminium nitrate, aluminium hydroxide and/or aluminium sulphate can be used. More preferable within the group of aluminium halogens is aluminium chloride. Magnesium salts can be preferably magnesium nitrate, magnesium chloride and/or magnesium sulphate.

Advantage of the aluminium salts and magnesium salts is that defects in the calcium silicate hydrate can be created via the introduction of ions different to calcium and silicon. This leads to an improved hardening acceleration effect. Preferably the molar ratio of aluminium and/or magnesium to calcium and silicon is small. More preferably the molar ratios are selected in a way that in the previous empirical formula the preferable ranges for a, b and e are fulfilled (0.66≤a≤1.8; 0≤b 0.1; 0≤e≤0.1).

Typically the calcium silicate hydrate in the composition, preferably aqueous hardening accelerator suspension, is foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α-C$_2$SH, dellaite, jaffeite, rosenhahnite, killalaite and/or suolunite.

More preferably the calcium silicate hydrate in the composition, preferably aqueous hardening accelerator suspension, is xonotlite, 9 Å—tobermorite (riversiderite), 11 Å-tobermorite, 14 Å—tobermorite (plombierite), jennite, metajennite, afwillite and/or jaffeite.

In a preferred embodiment of the invention the molar ratio of calcium to silicon in the calcium silicate hydrate in the composition, preferably aqueous hardening accelerator suspension, is from 0.6 to 2, preferably 0.8 to 1.8, most preferably 1.0 to 1.5.

In a further preferred embodiment of the invention the molar ratio of calcium to water in the calcium silicate hydrate is from 0.6 to 6, preferably 0.6 to 4.

It has been found that the presence of apatite during the preparation process of the hardening accelerator composition is advantageous with respect to the activity as a hardening accelerator of the calcium silicate hydrate suspension. The ratio of calcium to phosphor (phosphor in the form of apatite) is preferably from 25/1 to 400/1. It was found that also very little amounts of apatite can in an efficient way improve the hardening accelerator efficiency.

Preferably the apatite is present in the form according to the following general formula Ca$_5$[X(PO$_4$)$_3$], wherein X is OH, F, Cl and/or Br, preferably X is OH. It is possible that in the before mentioned general formula calcium ions are partially replaced by alkali metal ions, especially sodium ions, or strontium ions. Phosphate ions can be partially replaced by sulphate ions. Said replacement of calcium or phosphate ions is preferably less than 10 mol % of the total calcium ion content, respectively of the phosphate ion content. The replacement(s) of ions follow the general rule that the resulting charge of the apatite in the general formula is neutral.

It is supposed that the presence of apatite during the formation of calcium silicate hydrate promotes the production of particularly small particles of calcium silicate hydrate, which are especially efficient as a hardening accelerator.

Preferably the hardening accelerator composition obtainable by one of the processes of this invention, preferably aqueous hardening accelerator suspension, has a particle diameter smaller than 500 nm, preferably smaller than 300 nm, more preferably smaller than 200 nm, the particle size of the calcium silicate hydrate being measured by analytical ultracentrifugation.

Preferably the measurement of the particle diameter is done at a temperature of 25° C. via the analytical ultra centrifuge Beckman Model Optima XLI from Beckman Coulter GmbH.

According to the description in H. Cölfen, 'Analytical Ultracentrifugation of Nanoparticles', in *Encyclopedia of Nanoscience and Nanotechnology*, (American Scientific Publishers, 2004), pp. 67-88, the particle size distribution is measured via analytical ultracentrifugation as described in the following chapter. For the measurement the commercially available analytical ultra centrifuge "Beckman Model Optima XLI," from Beckman Coulter GmbH, 47807 Krefeld is used.

The samples are diluted with water to a suitable concentration. This concentration is typically between 1 and 40 g/l solid content of the sample. Preferably a relatively high dilution is chosen. The concentration to be chosen is preferably adapted according to the content of the calcium silicate hydrate particles in the sample to be analyzed. The suitable range can be easily found by the person skilled in the art and is particularly determined by the factors transparency of the sample and the measuring sensitivity. Typically the rotation speed of the ultracentrifuge is selected in the range from 2.000 to 20.000 rotations per minute (in the examples of FIG. 2 the rotation speed was 10.000 rotations per minute). The rotation speed can be chosen according to the needs of the specific sample, a higher speed of the ultracentrifuge will be preferably chosen when relatively small particles are involved and vice versa. The sedimentation rate s of the calcium silicate hydrate particles is measured with interference optics at 25° C. and is extracted from the interference data by a suitable evaluation software, for example Sedfit (http://www.analyticalultracentrifugation.com/default.htm).

According to the Stokes-Einstein Equation $$d = \sqrt{\frac{18\eta s}{\Delta \rho}}$$

the diameter of the particles d can be calculated with the measured sedimentation rate s.

η is the dynamic viscosity of the medium and was measured at 25° C. with a Brookfield LVDV-I viscosimeter at a rotation speed of 5 rounds per minute with the spindle number 1.s is the sedimentation rate of the particles.

Δρ is the difference of density at 25° C. between the calcium silicate hydrate particles and the medium. The density of the calcium silicate hydrate particles is estimated to be 2.1 g/cm³ according to a comparison with literature data. The density of the medium is estimated to be 1 g/cm³ (for a diluted aqueous solution). The influence of Δρ on the absolute values of the particle diameter d is supposed to be small and therefore the influence of the estimation of Δρ is also small.

Preferably the process is characterized in that the aqueous solution which contains the plasticizer or the plasticizers suitable for hydraulic binders contains the apatite. The formation of calcium silicate has to be done in the presence of the plasticizer (A), (B), (C) and/or (D). It has been found that it is advantageous to have the apatite in the aqueous solution which contains the plasticizer (A), (B), (C) and/or (D). It is for example possible to add the solution of the water-soluble calcium compound and the water-soluble silicate compound to the aqueous solution which contains the plasticizer (A), (B), (C) and/or (D) and the apatite. It this way the calcium silicate hydrate is formed in the presence of apatite and the plasticizer (A), (B), (C) and/or (D).

Preferable is a process, characterized in that the apatite is hydroxylapatite or comprises hydroxylapatite. In this case X is in the general formula of apatite OH.

Preferably the apatite is a halogenapatite or comprises a halogenapatite. In this case X is in general formula of apatite F, Cl and/or Br.

Preferable is a process, characterized in that the hardening accelerator composition contains calcium-silicate-hydrate and apatite. During the process according to this invention calcium silicate hydrate is formed. Apatite can be added at different points of time of the calcium silicate hydrate formation, most preferably at the initial stage.

The process is preferably characterized in that the molar ratio of silicium to phosphor in the hardening accelerator composition is higher than 10/1, preferably from 50/1 to 400/1, more preferably from 80/1 to 300/1. A good acceleration effect can be obtained.

Preferable is a process, characterized in that the apatite is produced in an in-situ reaction between phosphate ions and the water-soluble calcium salt, preferably during the reaction of the water-soluble calcium compound, preferably calcium salt, with the water-soluble silicate compound. It is known that calcium salts, as used in this invention for the formation of calcium silicate hydrate, react readily with phosphate ions to apatite. It is also possible to add the phosphate ions in the form of for example phosphoric acid, dihydrogenphosphate or hydrogenphosphate, as said reactants will under the preferably alkaline reaction conditions set free the phosphate ions. Accordingly it is possible to produce the apatite by adding phosphate ions to the reaction mixture, preferably during the initial stage of the formation of calcium silicate hydrate. An addition after all of the calcium silicate hydrate has reacted does not improve considerably the hardening acceleration effect. It is supposed that the apatite has an influence on the formation of calcium silicate hydrate, especially the particle size of calcium silicate hydrate is reduced if apatite is present. Apatite might be first formed as a kind of pre-seed for the formation of calcium silicate hydrate.

Preferable is a process, characterized in that the apatite is produced during the reaction of the water-soluble calcium compound, preferably calcium salt, with the water-soluble silicate compound and characterized in that the apatite is produced in the initial reaction phase before 10 weight % of the water-soluble calcium compound, preferably calcium salt, and before 10 weight % of the water-soluble silicate compound have reacted. In this context the term initial reaction phase means the reaction between the water-soluble calcium compound and the water-soluble silicate compound. Preferably the apatite is produced in the in-situ reaction before 10 weight % of the water-soluble calcium compound, preferably calcium salt and 10 weight % of the water-soluble silicate compound have been added to the reaction mixture.

Preferable is a process, characterized in that the apatite is added to the aqueous solution which contains a plasticizer suitable for hydraulic binders, selected from the group of (A) comb polymers, (B) polycondensates containing (I) at least one structural unit consisting of an aromatic or heteroaromatic moiety bearing a polyether side chain and (II) at least one structural unit consisting of an aromatic or heteroaromatic moiety bearing at least one phosphoric acid ester group, (C) lignosulphonates and/or (D) β-naphthalene sulphonate formaldehyde condensates (BNS) before 10 weight % of the water-soluble calcium compound, preferably calcium salt, and before 10 weight % of the water-soluble silicate compound have reacted. Preferably the apatite is premanufactured apatite, which means that in a separate reaction apatite was produced, if the case isolated and then added to the aqueous solution which contains plasticizer (A), (B), (C) and/or (D). More preferably the premanufactured apatite is produced in the presence of a plasticizer (A), (B), (C) and/or (D).

More preferably the apatite is added before the reaction of a water-soluble calcium compound, preferably calcium salt, with a water-soluble silicate compound has started. In this way the apatite is available in order to promote the formation of especially efficient calcium silicate hydrate.

There are different ways of producing the calcium silicate hydrate of this invention. It is preferable that the apatite is contained in the aqueous solution which contains plasticizer (A), (B), (C) and/or (D). The apatite can also be contained in for example an aqueous solution of the calcium compound or in an aqueous solution of the silicate compound. The presence of apatite in at least one of the solutions of a) plasticizer (A), (B), (C) and/or (D), b) in the solution of the water-soluble calcium compound or c) in the solution of the water-soluble silicate compound assures that the reaction of water-soluble calcium compound with the water-soluble silicate compound (calcium silicate hydrate formation) is carried out in the presence of apatite. Important is that said calcium silicate hydrate formation is done in the presence of apatite and the plasticizer (A), (B), (C) and/or (D).

In order to produce the calcium silicate hydrate in the presence of the plasticizer (A), (B), (C) and/or (D) the following methods are possible.

In a preferred embodiment of the invention, in a first step, the water-soluble calcium compound is mixed with the aqueous solution which contains plasticizer (A), (B), (C) and/or (D), so that a mixture preferably present as a solution is obtained, to which the water-soluble silicate compound is added in a subsequent second step. The water-soluble silicate compound of the second step can also contain the plasticizer (A), (B), (C) and/or (D). The apatite can be preferably contained in the aqueous solution which contains plasticizer (A), (B), (C) and/or (D).

The aqueous solution may also contain one or more further solvents (for example alcohols like ethanol and/or isopropanol) in addition to water. Preferably the weight proportion of the solvent other than water to the sum of water and further solvent (e.g. alcohol) is up to 20 weight %, more preferably less than 10 weight % and the most preferably less than 5 weight %. However most preferable are aqueous systems without any solvent.

The temperature range in which the process is carried out is not especially limited. Certain limits however are imposed by the physical state of the system. It is preferable to work in the range of 0 to 100° C., more preferable 5 to 80° C. and most preferable 15 to 35° C. High temperatures can be reached especially when a milling process is applied. It is preferable not to exceed 80° C. Also the process can be carried out at different pressures, preferably in a range of 1 to 5 bars.

The pH-value depends on the quantity of reactants (water-soluble calcium compound and water-soluble silicate) and on the solubility of the precipitated calcium silicate hydrate. It is preferable that the pH value is higher than 8 at the end of the synthesis, preferably in a range between 8 and 13.5.

In a further preferred embodiment, the aqueous solution containing plasticizer (A), (B), (C) and/or (D) furthermore has the water-soluble calcium compound and the water-soluble silicate compound as components dissolved in it. This means that the reaction of the water-soluble calcium compound and the water-soluble silicate compound in order to precipitate calcium silicate hydrate occurs in the presence of an aqueous solution which contains plasticizer (A), (B), (C) and/or (D). The apatite can be preferably contained in the aqueous solution which contains plasticizer (A), (B), (C) and/or (D).

A further preferred embodiment is characterized in that a solution of a water-soluble calcium compound and a solution of a water-soluble silicate compound are added preferably separately to the aqueous solution containing plasticizer (A), (B), (C) and/or (D). The apatite can be preferably contained in the aqueous solution which contains plasticizer (A), (B), (C) and/or (D). To illustrate how this aspect of the invention can be carried out, for example three solutions can be prepared separately (solution (I) of a water-soluble calcium compound, solution (II) of a water-soluble silicate compound and a solution (III) of plasticizer (A), (B), (C) and/or (D). Solutions (I) and (II) are preferably separately and simultaneously added to solution (III). Advantage of this preparation method is besides its good practicability that relatively small particle sizes can be obtained.

In a further preferred embodiment of the invention the above standing embodiment can be modified in that the solution of a water soluble calcium compound and/or the solution of a water-soluble silicate compound contain plasticizer (A), (B), (C) and/or (D). In this case the method is carried out in principle in the same way as described in the previous embodiment), but solution (I) and/or solution (II) preferably contain also plasticizer (A), (B), (C) and/or (D). In this case the person skilled in the art will understand that plasticizer (A), (B), (C) and/or (D) is or are distributed to at least two or three solutions. It is advantageous that 1 to 50%, preferably 10 to 25% of the total of the plasticizer (A), (B), (C) and/or (D) are contained in the calcium compound solution (e.g. solution (I)) and/or silicate compound solution (e.g. solution (II)). This preparation method has the advantage that the plasticizer (A), (B), (C) and/or (D) is present also in the solution of the water-soluble calcium compound and/or the solution of the water-soluble silicate compound.

In a further preferred embodiment of the invention the previous embodiment can be modified in that the aqueous solution containing plasticizer (A), (B), (C) and/or (D) contains a water-soluble calcium compound or a water-soluble silicate compound.

In this case the method is carried out in principle in the same way as described in the before standing embodiment but solution (III) would contain a water-soluble calcium compound or a water-soluble silicate compound. In this case the person skilled in the art will understand that the water-soluble calcium compound or the water-soluble silicate compound is distributed to at least two solutions.

Preferably the hardening accelerator composition is dosed at 0.01 to 10 weight %, most preferably at 0.1 to 2 weight % of the solids content with respect to the hydraulic binder, preferably cement. The solids content is determined in an oven at 60° C. until a constant weight of the sample is reached.

Often, the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium propionate, calcium silicate, calcium stearate, calcium sulphate, calcium sulphate hemihydrate, calcium sulphate dihydrate, calcium sulphide, calcium tartrate calcium aluminate, tricalcium silicate and/or dicalcium silicate. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate).

The water-soluble calcium compound is preferably present as calcium citrate, calcium tartrate, calcium formate, calcium acetate and/or calcium sulphate. Advantage of these calcium compounds is their non-corrosiveness. Calcium citrate and/or calcium tartrate are preferably used in combination with other calcium sources because of the possible retarding effect of these anions when used in high concentrations.

Preferably the calcium compound is present as calcium chloride and/or calcium nitrate. Advantage of these calcium compounds is their good solubility in water, low price and good availability.

Often, the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

The water-soluble silicate compound is preferably present as sodium metasilicate, potassium metasilicate and/or waterglass. Advantage of these silicate compounds is their extremely good solubility in water.

Preferably species of different types are used as the water-soluble silicate compound and as the water-soluble calcium compound.

Preferable is a process characterized in that the plasticizer suitable for hydraulic binders is selected from the group of (A) comb polymers and is present as a copolymer which contains, on the main chain, side chains having ether functions and acid functions.

Preferable is a process, characterized in that the plasticizer suitable for hydraulic binders is selected from the group of (A) comb polymers and is produced by free radical polymerization in the presence of acid monomer, preferably carboxylic acid monomer and polyether macromonomer, so that altogether at least 45 mol %, preferably at least 80 mol %, of all structural units of the copolymer are produced by incorporation of acid monomer, preferably carboxylic acid monomer and polyether macromonomer in the form of polymerized units.

Acid monomer is to be understood as meaning monomers which are capable of free radical copolymerization, have at least one carbon double bond, contain at least one acid function, preferably a carboxylic acid and/or a phosphoric acid ester function, and react as an acid in an aqueous medium. Furthermore, acid monomer is also to be understood as meaning monomers which are capable of free radical copolymerization, have at least one carbon double bond, form at least one acid function, preferably a carboxylic acid function, in an aqueous medium as a result of a hydrolysis reaction and react as an acid in an aqueous medium (example: maleic anhydride or hydrolysable esters of (meth)acrylic acid. The acid monomer can also be used in its form as partially or completely neutralized salt (e.g. in the form of an (earth)alkali metal salt, an (organic) ammonium salt or alkanolammonium salt).

In the context of the present invention, polyether macromonomers are compounds which are capable of free radical copolymerization, have at least one carbon double bond, and have at least two ether oxygen atoms, with the proviso that the polyether macromonomer structural units present in the copolymer have side chains which contain at least two ether oxygen atoms, preferably at least 4 ether oxygen atoms, more preferably at least 8 ether oxygen atoms, most preferably at least 15 ether oxygen atoms.

Structural units, which do not constitute an acid monomer or a polyether macromonomer can be for example styrene and derivatives of styrene (for example methyl substituted derivatives), vinyl acetate, vinyl pyrrolidon, butadiene, vinyl proprionate, unsaturated hydrocarbons like for example ethylene, propylene and/or (iso)butylene. This listing is a non-exhaustive enumeration. Preferable are monomers with not more than one carbon double bond.

In a preferred embodiment of the invention the plasticizer suitable for hydraulic binders is selected from the group of (A) comb-polymers and is a copolymer of styrene and a half ester of maleic acid with a monofunctional polyalkylene glycol. Preferably such a copolymer can be produced by free radical polymerization of the monomers styrene and maleic anhydride (or maleic acid) in a first step. In the second step polyalkylene glycols, preferably alkyl polyalkylene glycols (preferably alkyl polyethylene glycols, most preferably methyl polyethyleneglycol) are reacted with the copolymer of styrene and maleic anhydride in order to achieve an esterification of the acid groups. Styrene can be completely or partially replaced by styrene derivatives, for example methyl substituted derivatives. Copolymers of this preferred embodiment are described in U.S. Pat. No. 5,158,996, the disclosure of which is incorporated into the present patent application.

Frequently, a structural unit is produced in the copolymer by incorporation of the acid monomer in the form polymerized units, which structural unit is in accordance with the general formulae (Ia), (Ib), (Ic) and/or (Id)

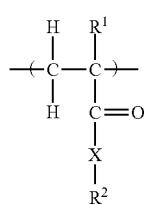
(Ia)

where
$R^1$ is H or a branched or non-branched $C_1$-$C_4$ alkyl group, $CH_2COOH$ or $CH_2CO$—X—$R^3$, X is NH—$(C_nH_{2n})$ or O—$(C_nH_{2n})$ with n being 1, 2, 3 or 4 or is a chemical bond, wherein the nitrogene atom, respectively the oxygene atom is bonded to the CO-group;
$R^2$ is OM, $PO_3M_2$ or O—$PO_3M_2$; with the proviso that X is a chemical bond if $R^2$ is OM;
$R^3$ is $PO_3M_2$ or O—$PO_3M_2$;

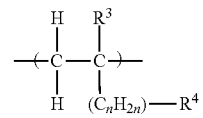
(Ib)

where
$R^3$ is H or a branched or non-branched $C_1$-$C_4$ alkyl group;
n is 0, 1, 2, 3 or 4;
$R^4$ is $PO_3M_2$ or O—$PO_3M_2$;

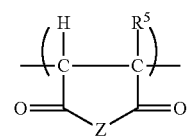
(Ic)

where
$R^5$ is H or a branched or non-branched $C_1$-$C_4$ alkyl group;
Z is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$ or $(C_6H_4)$—$OPO_3M_2$, and n is 1, 2, 3 or 4;

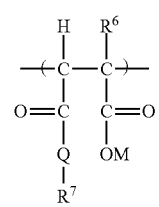
(Id)

where
$R^6$ is H or a branched or non-branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$ or $(C_6H_4)$—$OPO_3M_2$,
n is 1, 2, 3 or 4;
and
wherein each M is independently from each other H or a cation equivalent.

The cation equivalent of the parameter M is not especially limited. The term cation equivalent means that the respective cation in the formula is divided by the number of the charge of the cation. For example in the case of alkali metal cations, (alkyl)ammonium cations and alkanolammonium cations it is divided by one, in the case of cations with two charges (e.g. earth alkali cations) it is divided by 2 resulting in ½ earth alkali-cation, in the case of triple charged cations (e.g. $Al^{3+}$) ⅓ $Al^{3+}$ will result.

M is preferably the same or different and is independently from each other alkali metal cations, (alkyl)ammonium cations, alkanolammonium cations and/or ½ earth alkali metal cations.

Examples for monomers form which the general structures according to formula (Ia) can be derived are acrylic acid, methacrylic acid, hydroxyethylacrylate phosphoric acid ester and/or hydroxyethylmethacrylate phosphoric acid ester. It is possible that the respective phosphoric acid diesters of the before mentioned monoesters can be also contained in a mixture.

Typically, a structural unit is produced in the copolymer by incorporation of the polyether macromonomer in the form of polymerized units, which structural unit is in accordance with the general formulae (IIa), (IIb) and/or (IIc)

$$\begin{array}{c} R^{10} \ R^{11} \\ | \ \ | \\ -(C-C)- \\ | \ \ | \\ R^{12} \ (C_nH_{2n})-O-E-G-(AO)_a-R^{13} \end{array} \quad (IIa)$$

where $R^{10}$, $R^{11}$ and $R^{12}$ are in each case identical or different and, independently of one another, are represented by H or a branched or non-branched $C_1$-$C_4$ alkyl group;

E is a non-branched or branched $C_1$-$C_6$ alkylene group, a cyclohexylene group, $CH_2$—$C_6H_{10}$, 1,2-phenylene, 1,3-phenylene or 1,4-phenylene;

G is O, NH or CO—NH; or

E and G form together a chemical bond;

A is $C_xH_{2x}$ with x being 2, 3, 4 or 5 or $CH_2CH(C_6H_5)$;

n is 0, 1, 2, 3, 4 and/or 5;

a is an integer from 2 to 350;

$R^{13}$ is H, a branched or non-branched $C_1$-$C_4$ alkyl group, CO—$NH_2$ and/or $COCH_3$;

$$\begin{array}{c} R^{16} \ R^{17} \\ | \ \ | \\ -(C-C)- \\ | \ \ | \\ R^{18} \ (C_nH_{2n})-O-E-N-(AO)_a-R^{19} \\ \ \ \ \ \ \ \ \ \ \ \ \ \ \ \ \ \ \ \ \ \ \ | \\ \ \ \ \ \ \ \ \ \ \ \ \ \ \ \ \ \ \ \ \ \ \ (LO)_d-R^{20} \end{array} \quad (IIb)$$

where $R^{16}$, $R^{17}$ and $R^{18}$ are in each case identical or different and, independently of one another, are represented by H or a branched or non-branched $C_1$-$C_4$ alkyl group;

E is a branched or non-branched $C_1$-$C_6$ alkylene group, a cyclohexylene group, $CH_2$—$C_6H_{10}$, 1,2-phenylene, 1,3-phenylene or 1,4-phenylene or a chemical bond;

A is $C_xH_{2x}$ with x being 2, 3, 4 or 5 or $CH_2CH(C_6H_5)$;

n is 0, 1, 2, 3, 4 and/or 5;

L is $C_xH_{2x}$ with x is 2, 3, 4 or 5 or $CH_2CH(C_6H_5)$;

a is an integer from 2 to 350;

d is an integer from 1 to 350;

$R^{19}$ is H or a branched or non-branched $C_1$-$C_4$ alkyl group;

$R^{20}$ is H or a non-branched $C_1$-$C_4$ alkyl group;

$$\begin{array}{c} R^{21} \ R^{22} \\ | \ \ | \\ -(C-C)- \\ | \ \ | \\ R^{23} \ C-W-(AO)_a-R^{24}]_V \\ \ \ \ \ \ \| \\ \ \ \ \ \ O \end{array} \quad (IIc)$$

where $R^{21}$, $R^{22}$ and $R^{23}$ are in each case identical or different and, independently of one another, are represented by H or a branched or non-branched $C_1$-$C_4$ alkyl group;

W is O, $NR^{25}$, N,

V is 1 if W is O or $NR^{25}$; V is 2 if W is N;

A is $C_xH_{2x}$ where x=2, 3, 4 or 5 or $CH_2CH(C_6H_5)$;

a is an integer from 2 to 350;

$R^{24}$ is H or a branched or non-branched $C_1$-$C_4$ alkyl group, preferably a $C_1$-$C_4$ alkyl group;

and $R^{25}$ is H or a branched or non-branched $C_1$-$C_4$ alkyl group, preferably a $C_1$-$C_4$ alkyl group;

$$\begin{array}{c} R^6 \ H \\ | \ \ | \\ -(C-C)- \\ | \ \ | \\ MO-C \ \ \ C-Q-(AO)_a-R^{24}]_V \\ \| \ \ \ \ \ \ \| \\ O \ \ \ \ \ \ O \end{array} \quad (IId)$$

where $R^6$ is H or a branched or non-branched $C_1$-$C_4$ alkyl group;

Q is $NR^{10}$, N or O;

V is 1 if Q is O or $NR^{10}$; V is 2 if Q is N;

$R^{10}$ is H or a branched or non-branched $C_1$-$C_4$ alkyl group;

A is $C_xH_{2x}$ where x=2, 3, 4 or 5 or $CH_2CH(C_6H_5)$; and a is an integer from 2 to 350;

$R^{24}$ is H or a branched or non-branched $C_1$-$C_4$ alkyl group, preferably a $C_1$-$C_4$ alkyl group; M is independently from each other H or a cation equivalent. The term cation equivalent has the same meaning as in the before standing text.

Alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of 4 to 340 oxyalkylene groups is preferably used as the polyether macromonomer. Methacrylic acid, acrylic acid, maleic acid, maleic anhydride, a monoester of maleic acid or a mixture of a plurality of these components is preferably used as the acid monomer.

Examples for monomers form which the general structures according to formula (IIa) can be derived are vinyloxy-$C_2$-$C_4$-alkylene-polyethylenglycol, vinyloxy-$C_2$-$C_4$-alkylene-polyethylenglycol-$C_1$-$C_4$-alkylether, allyloxy-polyethylenglycol, allyloxy-polyethylenglycol-$C_1$-$C_4$-alkylether, methallyloxy-polyethylene-glycol, methallyloxy-polyethylenglycol-$C_1$-$C_4$-alkylether, isoprenyloxy-polyethylenglycol and/or isoprenyloxy-polyethylenglykol-$C_1$-$C_4$-alkylether.

Examples for monomers form which the general structures according to formula (IIc) can be derived are $C_1$-$C_4$-alkyl-polyethyleneglycol acrylic acid ester, polyethyleneglycol acrylic acid ester, $C_1$-$C_4$-alkyl-polyethyleneglycol methacrylic acid ester, polyethyleneglycol methacrylic acid ester, $C_1$-$C_4$-alkyl-polyethyleneglycol acryl acid ester, and/or polyethyleneglycol acrylic acid ester.

In a further embodiment of the invention the reaction is carried out completely or partially in the presence of an aqueous solution containing a viscosity enhancer polymer, selected from the group of polysaccharide derivatives and/or (co)polymers with an average molecular weight $M_w$ higher than 500.000 g/mol, more preferably higher than 1,000,000 g/mol, the (co)polymers containing structural units derived (preferably by free radical polymerization) from non-ionic (meth)acrylamide monomer derivatives and/or sulphonic acid monomer derivatives. It is possible that the viscosity enhancer polymer is added at the beginning, during the process or at the end of the process. For example it can be added to the aqueous solution of the comb polymer, to the calcium compound and/or the silicate compound. The viscosity enhancer polymer can also be used during the process of preparing a hardening accelerator composition by reaction of a calcium compound, preferably a calcium salt, most preferably a water-soluble calcium salt with a silicon dioxide containing component. Preferably the viscosity enhancer polymer is added at the end of the reaction (at the end of the reactants addition) in order to prevent any particles to be destabilized and to keep the best stability. The viscosity enhancer has a stabilizing function in that segregation (aggregation and sedimentation) of for example calcium silicate hydrate) can be prevented. Preferably the viscosity enhancers are used at a dosage from 0.001 to 10 weight %, more preferably 0.001 to 1 weight % with respect to the weight of the hardening accelerator suspension.

As polysaccharide derivative preference is given to cellulose ethers, for example alkylcelluloses such as methylcellulose, ethylcellulose, propylcellulose and methylethylcellulose, hydroxyalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxyethylcellulose (HEC) and ethylhydroxyethylcellulose (EHEC), and particular preference is given to methylhydroxyethylcelluose (MHEC) and methylhydroxypropylcelluose (MHPC). The abovementioned cellulose ether derivatives, which can in each case be obtained by appropriate alkylation or alkoxylation of cellulose, are preferably present as non ionic structures, however it would be possible to use for example also carboxymethylcellulose (CMC). In addition, preference is also given to using non ionic starch ether derivatives such as hydroxypropylstarch, hydroxyethylstarch and methyl-hydroxypropylstarch. Preference is given to hydroxypropylstarch. Preferable are also microbially produced polysaccharides such as welan gum and/or xanthans and naturally occurring polysaccharides such as alginates, carregeenans and galactomannans. These can be obtained from appropriate natural products by extractive processes, for example in the case of alginates and carregeenans from algae.

The viscosity enhancer (co)polymers with a weight average molecular weight $M_w$ higher than 500,000 g/mol, more preferably higher than 1,000,000 g/mol can be produced (preferably by free radical polymerization) from non-ionic (meth)acrylamide monomer derivatives and/or sulphonic acid monomer derivatives. The respective monomers can be selected for example from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of styrene sulphonic acid, 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentanesulphonic acid or the salts of the acids mentioned. It is preferable that the viscosity enhancer contains more than 50 mol %, more preferably more than 70 mol % of structural units derived from non-ionic (meth)acrylamide monomer derivatives and/or sulphonic acid monomer derivatives. Other structural units preferably being contained in the copolymers can be derived from for example the monomers (meth)acrylic acid, esters of (meth)acrylic acid with branched or non-branched C1 to C10 alcohols, vinyl acetate and/or vinyl proprionate.

In a further embodiment of the invention the viscosity enhancer polymer is a polysaccharide derivative selected from the group of methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight $M_w$ higher than 500.000 g/mol, more preferably higher than 1,000,000 g/mol, the (co)polymers containing structural units derived (preferably by free radical polymerization) from non-ionic (meth)acrylamide monomer derivatives selected from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentanesulphonic acid or the salts of the acids mentioned.

Within the group of non-ionic (meth)acrylamide monomer derivatives preference is given to methylacrylamide, N,N-dimethylacrylamide and/or methacrylamide, and particular preference is given to acrylamide. Within the group of sulphonic acid monomers 2-acrylamido-2-methylpropanesulphonic acid (AMPS) and its salts are preferable. The viscosity enhancer polymers can be added at the beginning of the process or at any other time.

In a further embodiment of the invention the reaction is carried out completely or partially in the presence of an aqueous solution containing hardening accelerators selected from the group of alkanolamines, preferably triisopropanolamine and/or tetrahydroxyethyl ethylene diamine (TH-EED). Preferably the alkanolamines are used at a dosage from 0.01 to 2.5 weight % with respect to the weight of hydraulic binder, preferably cement. Synergistic effects could be found when using amines, especially triisopropanolamine and tetrahydroxyethyl ethylene diamine, with respect to the early strength development of hydraulic binder systems, especially cementitious systems. Preferably the amine is added at the end of the reaction.

In another embodiment the reaction is carried out completely or partially in the presence of an aqueous solution containing setting retarders selected from the group of citric acid, tartaric acid, gluconic acid, phosphonic acid, aminotrimethylenphosphonic acid, ethylendiaminotetra(methylenphosphonic) acid, diethylentriaminopenta(methylenphosphonic) acid, in each case including the respective salts of the acids, pyrophosphates, pentaborates, metaborates and/or sugars (e.g. glucose, molasses). The advantage of the addition of setting retarders is that the open time can be controlled and in particular if necessary can be prolonged. The term "open-time" is understood by the person skilled in the art as the time interval after preparing the hydraulic binder mixture until the point of time at which the fluidity is considered as not sufficient anymore to allow a proper workability and the placement of the hydraulic binder mixture. The open-time depends on the specific requirements at the job site and on the type of application. As a rule the precast industry requires between 30 and 45 minutes and the ready-mix concrete industry requires about 90 minutes of open-time. Preferably the setting retarders are used at a dosage from 0.01 to 0.5 weight % with respect to the weight of hydraulic binder, preferably cement. The retarders can be added at the beginning of the process or at any other time.

Preferably is a process, characterized in that the hardening accelerator composition contains
i) 0.01 to 75, preferably 0.01 to 51, most preferably 0.01 to 15% by weight of calcium,
ii) 0.01 to 75, preferably 0.01 to 55, most preferably 0.01 to 10% by weight of silicate calculated as $SiO_4$,
iii) 0.001 to 60, preferably 0.1 to 30, most preferably 0.1 to 10% by weight of plasticizer suitable for hydraulic binders selected from (A), (B), (C) and/or (D),
iv) 24 to 99, preferably 50 to 99, most preferably 70 to 99% by weight of water and
v) $10^{-5}$ to 2.5%, preferably $10^{-5}$ to 1.63%, more preferably $10^{-5}$ to 0.5% by weight of phosphor, preferably in the form of apatite.

Preferable is a process characterized in that the hardening accelerator composition contains no (Portland) cement or that less than 20 weight %, more preferable less than 10 weight %, of (Portland) cement with respect to the total weight of the hardening accelerator composition is contained. Preferably the process is carried out in the absence of (Portland) cement and the obtained hardening accelerator does not contain (Portland) cement. Preferably the water/cement ratio (W/C) of the hardening accelerator composition is higher than 1, more preferably higher than 2, most preferably higher than 10.

Preferred is a process for the preparation of the hardening accelerator composition, followed by a process step in which the hardening accelerator composition is dried, preferably by a spray drying process.

The drying method is not especially limited, another possible drying method is for example the use of a fluid bed dryer. It is generally known that water, also if only in low quantities, is detrimental to many binders, especially cement, because of undesired premature hydration processes. Powder products with their typically very low content of water are advantageous compared to aqueous systems because it is possible to mix them into (Portland) cement and/or other binders like calcium sulphate hemihydrate (bassanite), anhydrous calcium sulphate, slags, preferably ground granulated blast furnace slag, fly ash, silica dust, metakaolin, natural pozzolan, calcined oil shale, calcium sulphoaluminate cement and/or calcium aluminate cement.

The invention furthermore relates to a hardening accelerator composition, preferably an apatite and calcium silicate hydrate containing hardening accelerator composition, which is obtainable by any of the processes described in the before standing text.

The compositions, preferably aqueous hardening accelerator suspensions can also contain any formulation component typically used in the field of construction chemicals, preferably defoamers, air entrainers, retarders, shrinkage reducers, redispersible powders, other hardening accelerators, anti-freezing agents and/or anti-efflorescence agents.

The invention comprises the use of a hardening accelerator composition obtainable according to any of the processes of this invention in building material mixtures containing (Portland) cement, (Portland) clinker, slag, preferably ground granulated blast furnace slag, fly ash, silica dust, metakaolin, natural pozzolans, calcined oil shale, calcium sulpho aluminate cement and/or calcium aluminate cement, preferably in building material mixtures which contain substantially (Portland) cement as a hydraulic binder. Preferably the use of the hardening accelerator compositions is for accelerating the hardening of building material mixtures containing (Portland) cement, (Portland) clinker, slag, preferably ground granulated blast furnace slag, fly ash, silica dust, metakaolin, natural pozzolans, calcined oil shale, calcium sulpho aluminate cement and/or calcium aluminate cement, preferably in building material mixtures which contain substantially (Portland) cement as a hydraulic binder.

Preferable are binder mixtures, which contain the before mentioned binders and $CaSO_4$ based binders like anhydrite or hemihydrate, preferably (Portland) cement and $CaSO_4$ based binders like anhydrite or hemihydrate. The content in $CaSO_4$ based binders can be up to 95% of the binder composition.

The invention comprises building material mixtures containing a hardening accelerator composition obtainable according to any of the processes of this invention and (Portland) cement, (Portland) clinker, slag, preferably ground granulated blast furnace slag, fly ash, silica dust, metakaolin, natural pozzolans, calcined oil shale, calcium sulpho aluminate cement and/or calcium aluminate cement. The hardening accelerator composition is contained in the building material mixture preferably at a dosage of 0.05 weight % to 5 weight % with respect to the clinker weight.

For illustration the term building material mixtures can mean mixtures in dry or aqueous form and in the hardened or plastic state. Dry building material mixtures could be for example mixtures of said binders, preferably cement and the hardening accelerator compositions (preferably in powder form) according to this invention. Mixtures in aqueous form, usually in the form of slurries, pastes, fresh mortar or fresh concrete are produced by the addition of water to the binder component(s) and the hardening accelerator composition, they transform then from the plastic to the hardened state.

EXAMPLES

1. Plasticizers According to this Invention

In the examples a comb polymer (A) was used, which was usually abbreviated as G.ACE 30. This abbreviation refers to the comb-type polymer Glenium® ACE30, a commercialized polycarboxylate ether (obtainable from BASF Italia S.p.A.) based on the monomers maleic acid, acrylic acid, vinyloxybutyl-polyethyleneglycol-5800 ($M_w$=40.000 g/mol (measured by G.P.C); the solid content of the sample is 44 weight %).

Preparation of Phosphated Polycondensates (General Procedure)

Also polycondensates (B) were used. The polycondensates (B) were produced according to the following general procedure:

A reactor, equipped with heating and stirrer is charged with a compound according to structural unit (I), for example polyethylenglycol monophenylether (in the following called PhPEG), a compound according to structural unit (II), for example polyethylenglycol monophenylether phosphate or phenoxyethanol phosphate (in the following called "phosphate") and a keton compound (IIIa), for example formaldehyde (paraformaladehyde can be used as well as aqueous formaldehyde or trioxane). The reaction mixture is heated to temperatures typically between 90° C. and 120° C. and the polycondensation is started by the addition of the acid catalyst (typically sulfuric acid or methansulfonic acid). Typically the reaction mixture is stirred for 1 to 6 hours until the desired molecular weight range has been achieved. The polycondensate is than diluted with water and neutralized to obtain a solution with 25-80 weight % solid content. Details of the process and the respective monomers according to the general procedure are summarized in table 1. In the table "Phosphate" type A means phenoxyethanol phosphate, B is polyethylenglycol monophenylether phosphate with 4 to 5 ethylene glycol units in average and C means polyethylenglycol monophenylether phosphate with 3 to 4 ethylene glycol units in average. The formaldehyde source F is a 30.5% aqueous solution of formaldehyde, P is paraformaldehyde. The Acid type S is sulphuric acid.

TABLE 1

| | Polymer composition of phosphated polycondensate | | | | | | | |
|---|---|---|---|---|---|---|---|---|
| Example | PhPEG Mn [g/mol] [g] | "Phosphate type [g] | $CH_2O$ source [g] | Acid type [g] | Reaction Temp. [° C.] | Reaction Time [min] | Solid Content [%] | Mol. Weight $M_w$ [g/mol] |
| B1 | 5000 800 | B 140 | PF 58 | S 32 | 110 | 300 | 47.2 | 34200 |

2. Preparation of Accelerator Compositions

The table 2 shows the details for the synthesis of C—S—H suspensions according to this invention. This table has to be read according to the following rules. The chemicals labeled P1, P2, P3 and P4 (column B, C, D, E) are added into the reactor always at the point of time t=0 (the start of the reaction) or when it is specified at the time specified. The chemicals labeled S1, S2, S3 and S4 (column F, G, H, I) are fed during the course of the synthesis with a constant feeding rate. In columns J, K, L, M the start of the feedings of products S1, S2, S3, S4 respectively are given as well as the durations of the feedings of S1, S2, S3, S4. All quantities are given in order to obtain 1000 g of hardening accelerator at the end of the synthesis. In column N are given the temperatures at which S1 (T1) and S2 (T2) are maintained, in column O are given the temperatures at which S3 (T3) and S4 (T4) are maintained, and in column P the temperature of the reactor during the synthesis. All syntheses are further stirred 30 minutes after the addition of reactants.

In the examples Acc. 23 to Acc. 27 calcium chloride, respectively calcium bromide, were added at the point of time t=0 to the reaction mixture. It is supposed that due to the presence of halogenide ions at least partially halogenapatite is produced.

The samples Acc. 1 (C), Acc. 13 (C) and Acc. 15 (C) are comparison examples, as the samples Acc. 1 (C) and Acc. 13 (C) are produced without apatite, whereas for the Acc. 15 (C) the addition of the apatite is at the end of the production process.

Calcium phosphate was also tested as a source of calcium ions. Due to its very low solubility in water the hardening accelerator suspensions could only be obtained in a rather diluted form. Due to the high amount of phosphate (molar ratio of calcium to phosphate is 3/2) the hardening accelerator effect was inferior to the hardening accelerators according to this invention with much lower phosphate contents.

TABLE 2

Details of preparation of accelerators and hardening acceleration A

| A Sample | B P1 G. ACE30 | C P2 | D P3 | E P4 | F S1 | G S2 | H S3 G. ACE30 | I S4 | J S1 | K S2 *) | L S3 *) | M S4 *) | N T°1/T°2 | O T°3/T°4 | P T | Q Solid Content | R A |
|---|---|---|---|---|---|---|---|---|---|---|---|---|---|---|---|---|---|
| Acc. 1 (C) | 105.5 g | | | 259.1 g (H$_2$O) | 214.3 g CN51 | 110.6 g Metso + 310.8 g water | | | 0 100 | 0 0 | | | 20° C. 20° C. | | 20° C. | 23.18% | 1.29 |
| Acc. 2 | 105.5 g | 0.47 g Na$_2$HPO$_4$ | | 259 g (H$_2$O) | 214.2 g CN51 | 110.3 g Metso + 310.7 g water | | | 0 100 | 0 100 | | | 20° C. 20° C. | | 20° C. | 22.65% | 2.38 |
| Acc. 3 | 105.5 g | 0.236 g Na$_2$HPO$_4$ | 0.236 g Na$_2$HPO$_4$ at t = t$_0$ + 30 min | 259 g (H$_2$O) | 214.2 g CN51 | 110.3 g Metso + 310.7 g water | | | 0 100 | 0 100 | | | 20° C. 20° C. | | 20° C. | 22.38% | 2.09 |
| Acc. 4 | 105.5 g | | 0.47 g Na$_2$HPO$_4$ at t = t$_0$ + 30 min | 259 g (H$_2$O) | 214.3 g CN51 | 110.6 g Metso + 310.8 g water | | | 0 100 | 0 100 | | | 20° C. 20° C. | | 20° C. | 22.63% | 1.44 |
| Acc. 5 | 103.6 g | 29.2 g of HAP1 | | 236.2 g (H$_2$O) | 209.9 g CN51 | 110.3 g Metso + 310.7 g water | | | 0 100 | 0 100 | | | 20° C. 20° C. | | 20° C. | 22.77% | 2.11 |
| Acc. 6 | 103.5 g | 58.4 g of HAP1 | | 207.3 g (H$_2$O) | 209.9 g CN51 | 110.3 g Metso + 310.7 g water | | | 0 100 | 0 100 | | | 20° C. 20° C. | | 20° C. | 22.77% | 2.27 |
| Acc. 7 | 103.6 g | 29.2 g of HAP2 | | 236.2 g (H$_2$O) | 209.9 g CN51 | 110.3 g Metso + 310.7 g water | | | 0 100 | 0 100 | | | 20° C. 20° C. | | 20° C. | 22.89% | 2.11 |
| Acc. 8 | 103.5 g | 58.4 g of HAP2 | | 207.3 g (H$_2$O) | 209.9 g CN51 | 110.3 g Metso + 310.7 g water | | | 0 100 | 0 100 | | | 20° C. 20° C. | | 20° C. | 22.83% | 2.27 |
| Acc. 9 | 103.6 g | 29.2 g of HAP3 | | 236.2 g (H$_2$O) | 209.9 g CN51 | 110.3 g Metso + 310.7 g water | | | 0 100 | 0 100 | | | 20° C. 20° C. | | 20° C. | 22.84% | 2.08 |
| Acc. 10 | 103.5 g | 58.4 g of HAP3 | | 207.3 g (H$_2$O) | 209.9 g CN51 | 110.3 g Metso + 310.7 g water | | | 0 100 | 0 100 | | | 20° C. 20° C. | | 20° C. | 22.80% | 2.28 |
| Acc. 11 | 103.5 g | 42.86 g of HAP1b | | 222.9 g (H$_2$O) | 209.8 g CN51 | 110.3 g Metso + 310.7 g water | | | 0 100 | 0 100 | | | 20° C. 20° C. | | 20° C. | 22.78% | 1.63 |
| Acc. 12 | 103.5 g | 58.4 g of HAP3b | | 207.3 g (H$_2$O) | 209.9 g CN51 | 110.3 g Metso + 310.7 g water | | | 0 100 | 0 100 | | | 20° C. 20° C. | | 20° C. | 22.72% | 1.53 |
| Acc. 13 (C) | 40.7 g | | | 464 g (H$_2$O) | 215.5 g CN51 | 111 g Metso + 115.8 g water | 53 g | | 0 50 | 0 50 | 0 50 | | 20° C. 50 | 20° C. | 20° C. | | 1.32 |
| Acc. 14 | 40.5 g | 102.4 g of HAP1c | | 363.2 g (H$_2$O) | 214.8 g CN51 | 110.6 g Metso + 115.5 g water | 52.9 g | | 0 50 | 0 50 | 0 50 | | 20° C. 50 | 20° C. | 20° C. | 22.68% | 1.84 |
| Acc. 15 (C) | 40.5 g | | 102.4 g of HAP1c at t = t$_0$ + 50 min | 363.2 g (H$_2$O) | 214.8 g CN51 | 110.6 g Metso + 115.5 g water | 52.9 g | | 0 50 | 0 50 | 0 50 | | 20° C. 50 | 20° C. | 20° C. | 22.70% | 1.31 |
| Acc. 16 | 39.9 g | 0.61 g of Ca(OH)$_2$ | | 461 g (H$_2$O) | 215.1 g CN51 | 110.8 g Metso + 115.7 g water | 52 g | | 5 50 | 5 50 | 5 50 | 0 5 | 20° C. 50 | 20° C. | 20° C. | 22.74% | 2.14 |
| Acc. 17 | 40.6 g | | 0.54 g of H$_3$PO$_4$ (85%) | 463.8 g (H$_2$O) | 215.4 g CN51 | 110.9 g Metso + 115.8 g water | 53 g | | 0 50 | 0 50 | 0 50 | | 20° C. 50 | 20° C. | 20° C. | 22.81% | 1.98 |
| Acc. 18 | 40.5 g | | 0.81 g of H$_3$PO$_4$ (85%) | 463.6 g (H$_2$O) | 215.3 g CN51 | 110.9 g Metso + 115.8 g water | 53 g | | 0 50 | 0 50 | 0 50 | | 20° C. 50 | 20° C. | 20° C. | 22.67% | 2.05 |
| Acc. 19 | 40.5 g | | 0.34 g of Na$_2$HPO$_4$ | 463.9 g (H$_2$O) | 215.4 g CN51 | 110.9 g Metso + 115.8 g water | 53 g | | 0 50 | 0 50 | 0 50 | | 20° C. 50 | 20° C. | 20° C. | 22.74% | 1.91 |
| Acc. 20 | 40.6 g | | 0.67 g of Na$_2$HPO$_4$ | 463.8 g (H$_2$O) | 215.3 g CN51 | 110.9 g Metso + 115.8 g water | 53 g | | 0 50 | 0 50 | 0 50 | | 20° C. 50 | 20° C. | 20° C. | 22.62% | 1.9 |

TABLE 2-continued

Details of preparation of accelerators and hardening acceleration A

| A Sample | B P1 G. ACE30 | C P2 | D P3 | E P4 | F S1 | G S2 | H S3 G. ACE30 | I S4 | J S1 | K S2 *) | L S3 *) | M S4 *) | N T° 1/T° 2 | O T° 3/T° 4 | P T | Q Solid Content | R A |
|---|---|---|---|---|---|---|---|---|---|---|---|---|---|---|---|---|---|
| Acc. 21 | 40.6 g | | 1.01 g of Na₂HPO₄ | 463.6 g (H₂O) | 215.2 g CN51 | 110.8 g Metso + 115.7 g water | 53 g | | 50 | 0 | 0 | 0 | 20° C. 50 | 20° C. | 20° C. | 22.66% | 1.9 |
| Acc. 22 | 40.6 g | 1.16 g of CaCl₂, 2 H2O | 0.187 g of NaOH 1M | 458.6 g (H₂O) | 215.1 g CN51 | 110.8 g Metso + 115.7 g water | 53 g | 0.54 g of H₃PO₄ (85%) + 4.38 g of water | 5 | 5 | 5 | 5 | 20° C. 50 | 20° C. | 20° C. | 22.73% | 2.3 |
| Acc. 23 | 40.6 g | 2.31 g of CaCl₂, 2 H2O | 0.374 g of NaOH 1M | 453.2 g (H₂O) | 214.8 g CN51 | 110.6 g Metso + 115.5 g water | 53 g | 1.08 g of H₃PO₄ (85%) + 8.74 g of water | 10 | 10 | 10 | 10 | 20° C. 50 | 20° C. | 20° C. | 22.68% | 2.08 |
| Acc. 24 | 40.6 g | 0.94 g of CaBr₂ | 0.187 g of NaOH 1M | 458.9 g (H₂O) | 215.1 g CN51 | 110.6 g Metso + 115.5 g water | 53 g | 0.54 g of H₃PO₄ (85%) + 4.38 g of water | 5 | 5 | 5 | 5 | 20° C. 50 | 20° C. | 20° C. | 22.56% | 1.92 |
| Acc. 25 | 40.6 g | 1.88 g of CaBr₂ | 0.374 g of NaOH 1M | 453.7 g (H₂O) | 214.8 g CN51 | 110.6 g Metso + 115.5 g water | 53 g | 1.08 g of H₃PO₄ (85%) + 8.74 g of water | 10 | 10 | 10 | 10 | 20° C. 50 | 20° C. | 20° C. | 22.56% | 1.85 |
| Acc. 26 | 40.6 g | 0.471 g of CaBr₂ | 0.094 g of NaOH 1M | 461.5 g (H₂O) | 215.3 g CN51 | 110.9 g Metso + 115.7 g water | 53 g | 0.27 g of H₃PO₄ (85%) + 2.19 g of water | 5 | 5 | 5 | 5 | 20° C. 50 | 20° C. | 20° C. | 22.52% | 2.05 |

*) Start Time Duration [min]

CN51 is a calcium nitrate aqueous suspension (51 weight % solid content) commercialized by Euroliquids. Metso is a sodium metasilicate powder ($Na_2SiO_3$, 5 $H_2O$) commercialized by PQ corporation.

In the samples Acc. 5 to Acc. 12 and Acc. 14 different suspensions of hydroxylapatite (labeled HAP-Nr., column C (P2)) were premanufactured and then used in the syntheses of the accelerators. The premanufactured hydroxylapatite was then added to the reaction mixture at the time t=0 (please compare with table 2). The hardening acceleration A in table 2 is the result of calorimetric experiments and will be explained in the text later on.

Details of the premanufactured hydroxylapatite syntheses can be found in table 3. All quantities are given in order to obtain 1000 g of accelerator at the end (table 3). The temperature of all reactants and the reactor itself is controlled at 20° C. P1, P2 and P3 are added in advance into the reactor. The stirring time after the addition of phosphoric acid (S1) is 30 min. In the column S of table 3 is specified the time elapsed between the end of the synthesis of the premanufactured hydroxylapatite and the use in the synthesis of C—S—H. It is preferable that the hydroxylapatites are freshly synthesized as it can be concluded with the comparison of samples Acc. 6 and Acc. 11 as well as samples Acc. 9 and Acc. 12. This effect is attributed to the Ostwald ripening of the hydroxylapatite crystals over time.

cement was used. In this study, the dosage of accelerators, expressed with respect to the active content, is constant and equal to 0.35 weight % of active weight by cement weight. The active content is the quantity of calcium-silicate-hydrate in accelerator compositions and is calculated with the following method. We consider that the active content is the total solid weight (given by the measured solid content) minus the organic part, minus the sodium ions, minus the nitrate ions and minus the phosphate ions. The organic part, the sodium, the phosphate and nitrate ions are simply deducted from syntheses. In the following an example for the explanation of the calorimetric method is given.

FIG. 1: Heat Flow Evolution of a Cement Paste

The heat flow released during the hydration is measured by calorimetry and is proportional to the hydration rate of cement. The hydration acceleration can be therefore described by the first derivate of the heat flow with time. The performances of the hardening accelerator suspensions are estimated with the ratio:

$$A = \frac{Acc._{with\ CSH}}{ACC._{ref}}$$

TABLE 3

Details of preparation of premanufactured apatites

| A Sample | B P1 | C P2 | D P3 | F S1 | J S1 Start Time Duration [min] | S Delay between synthesis and use in Accelerator Synthesis | Q Solid Content [%] |
|---|---|---|---|---|---|---|---|
| HAP1 | 21.7 g of G. ACE 30 | 905.1 g of water | 7.3 g of $Ca(OH)_2$ | 65.9 g of 1M $H_3PO_4$ | 0/10 min | 0 | 2.85% |
| HAP2 | 22.4 g of B1 | 904.4 g of water | 7.2 g of $Ca(OH)_2$ | 65.9 g of 1M $H_3PO_4$ | 0/10 min | 0 | 2.82% |
| HAP3 | | 926 g of water | 7.4 g of water | 66.6 g of 1M $H_3PO_4$ | 0/10 min | 0 | 1.49% |
| HAP1b | 21.7 g of G. ACE 30 | 905.1 g of water | 7.3 g of $Ca(OH)_2$ | 65.9 g of 1M $H_3PO_4$ | 0/10 min | 24 hours | 2.84% |
| HAP3b | | 926 g of water | 7.4 g of water | 66.6 g of 1M $H_3PO_4$ | 0/10 min | 24 hours | 1.50% |
| HAP1c | 21.7 g of G. ACE 30 | 905.1 g of water | 7.3 g of $Ca(OH)_2$ | 65.9 g of 1M $H_3PO_4$ | 0/10 min | 0 | 2.83% |

Calorimetry Tests

In order to test the efficiency of the calcium silicate hydrate suspensions as accelerator, calorimetry tests were performed. It is known that the hydration heat released during the hydration of cement is directly connected to the mechanical properties of the cement paste (H. F: W. Taylor, The cement chemistry, 2nd Edition, 1997. The mechanical properties of mortars or concretes come from the cement matrix (H. F: W. Taylor, The cement chemistry, 2nd Edition, 1997). By monitoring the heat released during the hydration of cement, direct information about the mechanical strength development in mortars or in concretes made with this cement can be obtained. All tests were carried out at the constant W/C ratio of 0.5. Accordingly 50 g of cement and 25 g distilled water (containing if the case the accelerator in dispersed form (batching water)) were mixed with a stirrer during two minutes. Then 3 g of the cement paste were added and sealed in a plastic ampoule and inserted in the calorimeter (TAM-AIR, TA Instruments). The temperature is controlled at 20° C. The accelerator suspensions were first dispersed in the batching water, in the case of the blank comparison (without accelerator), only distilled water and The acceleration values A, which are characteristic for the acceleration effect provided by the hardening accelerator compositions are listed in table 2 (last column). An acceleration of 1 does not give any improvement compared to the reference (blank without accelerator additive), an acceleration of 2 doubles the hydration rate in the first hours compared to the reference. For all calorimetric curves accelerated with the calcium silicate hydrate based accelerators a shift on the time scale to the left was observed. This means that the hydration starts earlier than for the reference. Also it means that the value A (hydration acceleration) can be considered as the relevant acceleration parameter.

From the values of A it becomes clear that compared to the references the acceleration values are considerably higher, which means also a better dosage efficiency. The values correspond in general with concrete experiments.

The invention claimed is:

1. Process for the preparation of a hardening accelerator composition, containing calcium silicate hydrate, by reaction of a water-soluble calcium compound, optionally calcium salt, with a water-soluble silicate compound, the reaction of the water-soluble calcium compound with the water-soluble silicate compound being carried out in the presence of an aqueous solution which contains a plasticizer for hydraulic binders, selected from the group of (A) comb polymers, (B) polycondensates containing (I) at least one structural unit consisting of an aromatic or heteroaromatic moiety bearing a polyether side chain and (II) at least one structural unit consisting of an aromatic or heteroaromatic moiety bearing at least one phosphoric acid ester group, (C) lignosulphonates and/or (D) β-naphthalene sulphonate formaldehyde condensates (BNS), characterized in that the reaction of the water-soluble calcium compound with the water-soluble silicate compound is being carried out in the presence of apatite and that the molar ratio of calcium to phosphorus in the hardening accelerator is from 25/1 to 400/1.

2. The process according to claim 1, characterized in that the aqueous solution which contains the plasticizer or the plasticizers for hydraulic binders contains the apatite.

3. The process according to claim 1, characterized in that the apatite is hydroxylapatite or comprises hydroxylapatite.

4. The process according to claim 1, characterized in that the apatite is a halogenapatite or comprises a halogenapatite.

5. The process according to claim 1, characterized in that the hardening accelerator composition contains calcium-silicate-hydrate and apatite.

6. The process according to claim 1, characterized in that the molar ratio of silicon to phosphorus in the hardening accelerator composition is higher than 10/1, optionally from 50/1 to 400/1, further optionally from 80/1 to 300/1.

7. The process according to claim 1, characterized in that the apatite is produced in an in-situ reaction between phosphate ions and the water-soluble calcium salt, optionally during the reaction of the water-soluble calcium compound, optionally calcium salt, with the water-soluble silicate compound.

8. The process according to claim 7, characterized in that the apatite is produced during the reaction of the water-soluble calcium compound, optionally calcium salt, with the water-soluble silicate compound and characterized in that the apatite is produced in the initial reaction phase before 10 weight % of the water-soluble calcium compound, optionally calcium salt, and before 10 weight % of the water-soluble silicate compound have reacted.

9. The process according to claim 1, characterized in that the apatite is added to the aqueous solution which contains a plasticizer for hydraulic binders, selected from the group of (A) comb polymers, (B) polycondensates containing (I) at least one structural unit consisting of an aromatic or heteroaromatic moiety bearing a polyether side chain and (II) at least one structural unit consisting of an aromatic or heteroaromatic moiety bearing at least one phosphoric acid ester group, (C) lignosulphonates and/or (D) β-naphthalene sulphonate formaldehyde condensates (BNS) before 10 weight % of the water-soluble calcium compound, optionally calcium salt, and before 10 weight % of the water-soluble silicate compound have reacted.

10. The process according to claim 1, characterized in that the plasticizer for hydraulic binders is selected from the group of (A) comb polymers and is present as a copolymer which contains, on the main chain, side chains having ether functions and acid functions.

11. The process according to claim 1 characterized in that the plasticizer for hydraulic binders is selected from the group of (A) comb polymers and is produced by free radical polymerization in the presence of acid monomer and polyether macromonomer, so that altogether at least 45 mol %, optionally at least 80 mol %, of all structural units of the copolymer are produced by incorporation of acid monomer and polyether macromonomer in the form of polymerized units.

12. The process according to claim 11, characterized in that a structural unit is produced in the copolymer by incorporation of the acid monomer in the form of polymerized units, which structural unit is in accordance with one of the general formulae (Ia), (Ib), (Ic) and/or (Id)

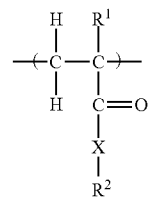
(Ia)

where
$R^1$ is H or a branched or non-branched $C_1$-$C_4$ alkyl group, $CH_2COOH$ or $CH_2CO$—X—$R^3$, X is NH—$(C_nH_{2n})$ or O—$(C_nH_{2n})$ with n being 1, 2, 3 or 4 or is a chemical bond, wherein the nitrogen atom, respectively the oxygen atom is bonded to the CO-group;
$R^2$ is OM, $PO_3M_2$ or O—$PO_3M_2$; with the proviso that X is a chemical bond if $R^2$ is OM;
$R^3$ is $PO_3M_2$ or O—$PO_3M_2$;

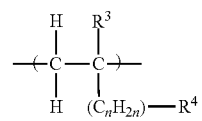
(Ib)

where
$R^3$ is H or a branched or non-branched $C_1$-$C_4$ alkyl group;
n is 0, 1, 2, 3 or 4;
$R^4$ is $PO_3M_2$ or O—$PO_3M_2$;

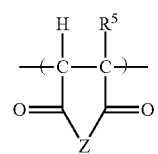
(Ic)

where
$R^5$ is H or a branched or non-branched $C_1$-$C_4$ alkyl group;
Z is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$ or $(C_6H_4)$—$OPO_3M_2$, and n is 1, 2, 3 or 4;

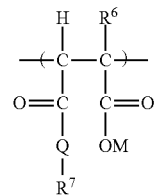
(Id)

where
$R^6$ is H or a branched or non-branched $C_1$-$C_4$ alkyl group;
Q is $NR^7$ or O;

$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$ or $(C_6H_4)$—$OPO_3M_2$, n is 1, 2, 3 or 4; and wherein each M is independently from each other H or a cation equivalent.

13. The process according to claim 11, characterized in that a structural unit is produced in the copolymer by incorporation of the polyether macromonomer in the form of polymerized units, which structural unit is in accordance with one of the general formulae (IIa), (IIb), (IIc) and/or (IId)

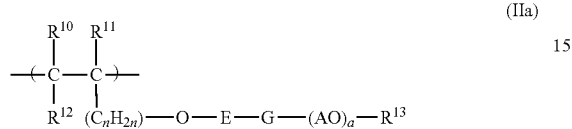
(IIa)

where $R^{10}$, $R^{11}$ and $R^{12}$ are in each case identical or different and, independently of one another, are represented by H or a branched or non-branched $C_1$-$C_4$ alkyl group;

E is a non-branched or branched $C_1$-$C_6$ alkylene group, a cyclohexylene group, $CH_2$—$C_6H_{10}$, 1,2-phenylene, 1,3-phenylene or 1,4-phenylene;

G is O, NH or CO—NH; or

E and G form together a chemical bond;

A is $C_xH_{2x}$ with x being 2, 3, 4 or 5 or $CH_2CH(C_6H_5)$;

n is 0, 1, 2, 3, 4 and/or 5;

a is an integer from 2 to 350;

$R^{13}$ is H, a branched or non-branched $C_1$-$C_4$ alkyl group, CO—$NH_2$ and/or $COCH_3$;

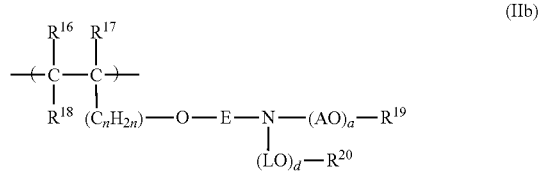
(IIb)

where $R^{16}$, $R^{17}$ and $R^{18}$ are in each case identical or different and, independently of one another, are represented by H or a branched or non-branched $C_1$-$C_4$ alkyl group;

E is a branched or non-branched $C_1$-$C_6$ alkylene group, a cyclohexylene group, $CH_2$—$C_6H_{10}$, 1,2-phenylene, 1,3-phenylene or 1,4-phenylene or a chemical bond;

A is $C_xH_{2x}$ with x being 2, 3, 4 or 5 or $CH_2CH(C_6H_5)$;

n is 0, 1, 2, 3, 4 and/or 5;

L is $C_xH_{2x}$ with x is 2, 3, 4 or 5 or $CH_2CH(C_6H_5)$;

a is an integer from 2 to 350;

d is an integer from 1 to 350;

$R^{19}$ is H or a branched or non-branched $C_1$-$C_4$ alkyl group;

$R^{20}$ is H or a non-branched $C_1$-$C_4$ alkyl group;

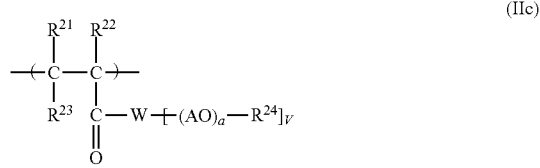
(IIc)

where $R^{21}$, $R^{22}$ and $R^{23}$ are in each case identical or different and, independently of one another, are represented by H or a branched or non-branched $C_1$-$C_4$ alkyl group;

W is O, $NR^{25}$, N,

V is 1 if W is O or $NR^{25}$; V is 2 if W is N;

A is $C_xH_{2x}$ where x=2, 3, 4 or 5 or $CH_2CH(C_6H_5)$;

a is an integer from 2 to 350;

$R^{24}$ is H or a branched or non-branched $C_1$-$C_4$ alkyl group, optionally a $C_1$-$C_4$ alkyl group;

and $R^{25}$ is H or a branched or non-branched $C_1$-$C_4$ alkyl group, optionally a $C_1$-$C_4$ alkyl group;

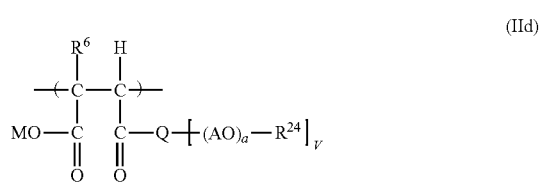
(IId)

where $R^6$ is H or a branched or non-branched $C_1$-$C_4$ alkyl group;

Q is $NR^{10}$, N or O;

V is 1 if Q is O or $NR^{10}$; V is 2 if Q is N;

$R^{10}$ is H or a branched or non-branched $C_1$-$C_4$ alkyl group;

A is $C_xH_{2x}$ where x=2, 3, 4 or 5 or $CH_2CH(C_6H_5)$; and a is an integer from 2 to 350;

$R^{24}$ is H or a branched or non-branched $C_1$-$C_4$ alkyl group, optionally a $C_1$-$C_4$ alkyl group;

M is independently from each other H or a cation equivalent.

14. The process according to claim 1, characterized in that in the polycondensate (B) the structural units (I) and (II) are represented by the following general formulae

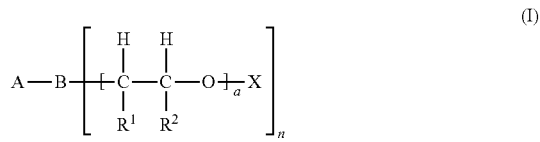
(I)

where

A are identical or different and are represented by a substituted or unsubstituted aromatic or heteroaromatic compound having 5 to 10 C atoms where B are identical or different and are represented by N, NH or O where n is 2 if B is N and n is 1 if B is NH or O where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H where a are identical or different and are represented by an integer from 1 to 300 where

X are identical or different and are represented by a branched or straight-chain $C_1$- to $C_{10}$-alkyl radical, $C_5$- to $C_8$-cycloalkyl radical, aryl radical, heteroaryl radical or H

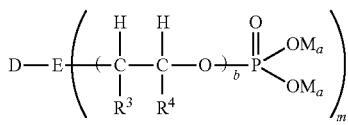

where
D are identical or different and are represented by a substituted or unsubstituted heteroaromatic compound having 5 to 10 C atoms
where
E are identical or different and are represented by N, NH or O
where
m is 2 if E is N and m is 1 if E is NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
b are identical or different and are represented by an integer from 1 to 300
where
M is independently of one another an alkaline metal ion, alkaline earth metal ion, ammonium ion, organic ammonium ion and/or H,
a is 1 or in the case of alkaline earth metal ions is 1/2.

15. The process according to claim 14, characterized in that the molar ratio of the structural units (I):(II) is 1:10 to 10:1.

16. The process according to any of claim 14, characterized in that the polycondensate contains a further structural unit (III) which is represented by the following formula

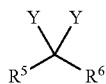

where
Y, independently of one another, are identical or different and are represented by (I), (II), or further constituents of the polycondensate
where
$R^5$ are identical or different and are represented by H, $CH_3$, COOH or a substituted or unsubstituted aromatic or heteroaromatic compound having 5 to 10 C atoms
where
$R^6$ are identical or different and are represented by H, $CH_3$, COOH or a substituted or unsubstituted aromatic or heteroaromatic compound having 5 to 10 C atoms.

17. The process according to claim 16, characterized in that $R^5$ and $R^6$ in structural unit (III), independently of one another, are identical or different and are represented by H, COOH and/or methyl.

18. The process according to claim 16, characterized in that the molar ratio of the structural units [(I)+(II)]:(III) is 1:0.8 to 3 in the polycondensate.

19. The process according to claim 1, characterized in that the hardening accelerator composition contains
i) 0.01 to 75, optionally 0.01 to 51, further optionally 0.01 to 15% by weight of calcium,
ii) 0.01 to 75, optionally 0.01 to 55, further optionally 0.01 to 10% by weight of silicate calculated as $SiO_4$,
iii) 0.001 to 60, optionally 0.1 to 30, further optionally 0.1 to 10% by weight of plasticizer for hydraulic binders selected from (A), (B), (C) and/or (D),
iv) 24 to 99, optionally 50 to 99, further optionally 70 to 99% by weight of water and
v) $10^{-5}$ to 2.5%, optionally $10^{-5}$ to 1.63%, further optionally $10^{-5}$ to 0.5% by weight of phosphorus.

20. The process according to claim 1, characterized in that the hardening accelerator composition contains no (Portland) cement or that less than 20 weight % of (Portland) cement with respect to the total weight of the hardening accelerator composition is contained.

21. The process according to claim 1, followed by a process step in which the hardening accelerator composition is dried, optionally by a spray drying process.

* * * * *